United States Patent [19]

Shikaumi et al.

[11] Patent Number: 5,101,230
[45] Date of Patent: Mar. 31, 1992

[54] IMAGE STABILIZATION DEVICE FOR A CAMERA

[75] Inventors: Masao Shikaumi; Toru Nagata, both of Yokohama; Hiroshi Sumio; Koichi Washisu, Tokyo, all of Japan

[73] Assignee: Canon Kabushiki Kaisha, Tokyo, Japan

[21] Appl. No.: 653,746

[22] Filed: Feb. 11, 1991

Related U.S. Application Data

[63] Continuation of Ser. No. 522,084, May 14, 1990, abandoned, which is a continuation of Ser. No. 423,581, Oct. 17, 1989, abandoned, which is a continuation of Ser. No. 271,421, Nov. 15, 1988, abandoned.

[30] Foreign Application Priority Data

Nov. 16, 1987 [JP] Japan ................. 62-289139
May 27, 1988 [JP] Japan ................. 63-129624

[51] Int. Cl.⁵ ............................................ G03B 7/08
[52] U.S. Cl. .............................. 354/430; 354/402; 354/70
[58] Field of Search ............... 354/430, 70, 286, 402

[56] References Cited

U.S. PATENT DOCUMENTS

| | | | |
|---|---|---|---|
| 3,728,948 | 4/1973 | Fraser | 354/70 |
| 3,910,693 | 10/1975 | De la Clerva | 354/70 |
| 3,982,255 | 9/1976 | Orlando | 354/70 |
| 4,013,339 | 3/1977 | Ando et al. | 354/70 |
| 4,290,684 | 9/1981 | Hines | 354/286 |
| 4,780,739 | 10/1988 | Kawakami et al. | 354/430 |

*Primary Examiner*—Russell E. Adams
*Attorney, Agent, or Firm*—Fitzpatrick, Cella, Harper & Scinto

[57] ABSTRACT

An image stabilization device includes image processing means for receiving a beam from an object and utilizing the beam as image information, blur correcting means for driving an imaging system to correct blurring of an image, initial setting means for setting the imaging means to an initial drive state of the blur correcting means, and interlocking control means for inhibiting a simultaneous operation of the image processing means and the initial setting means.

48 Claims, 20 Drawing Sheets

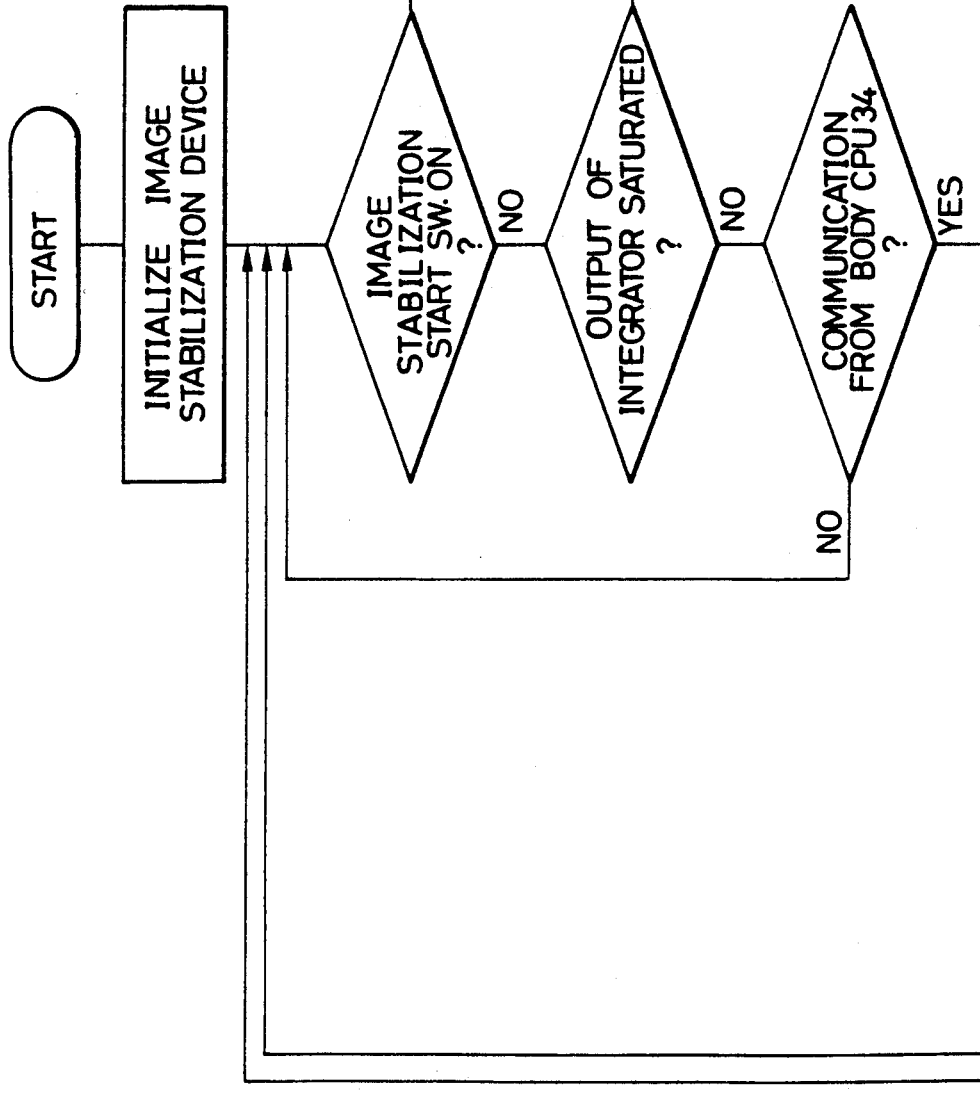

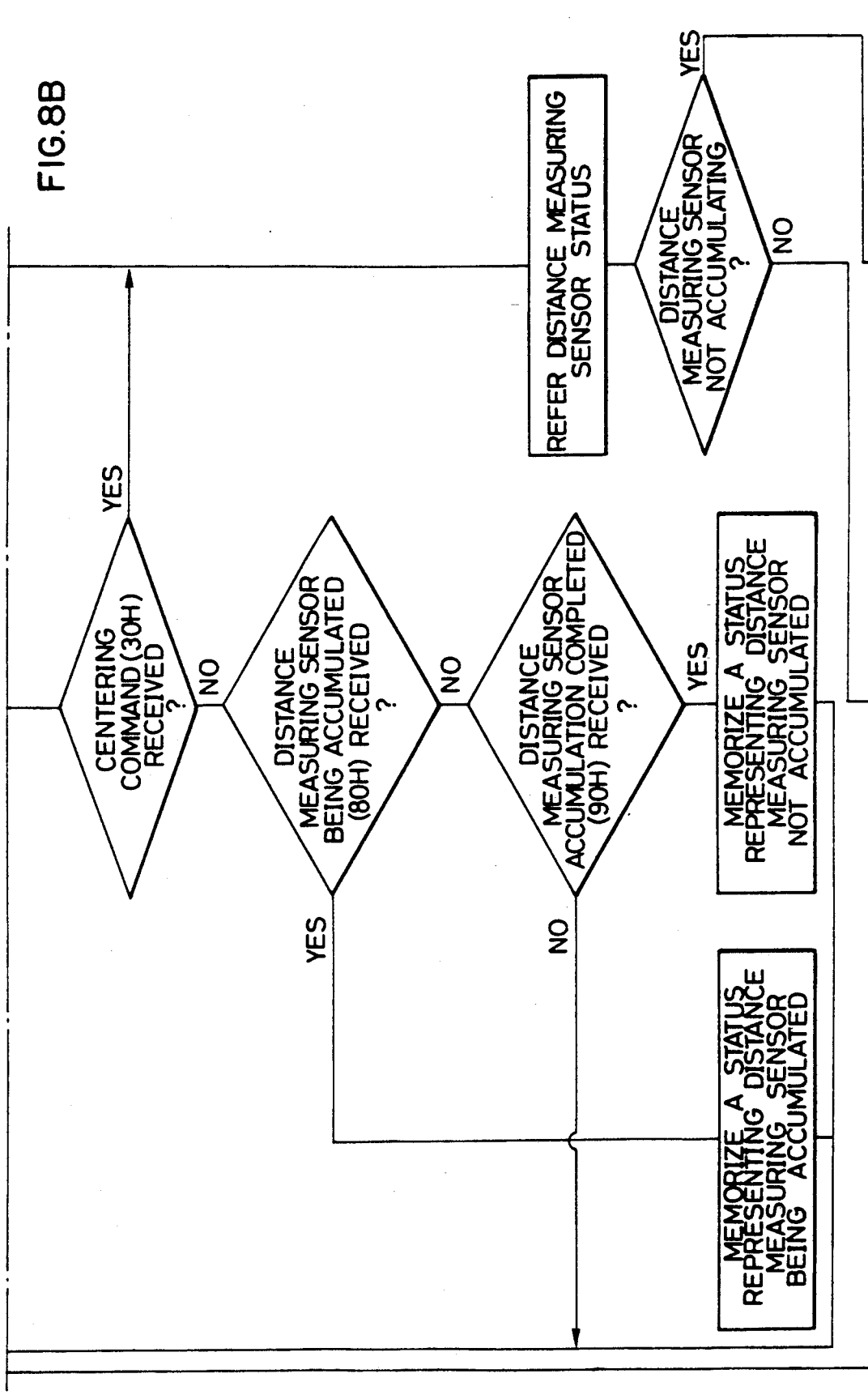

FIG. 18
PRIOR ART
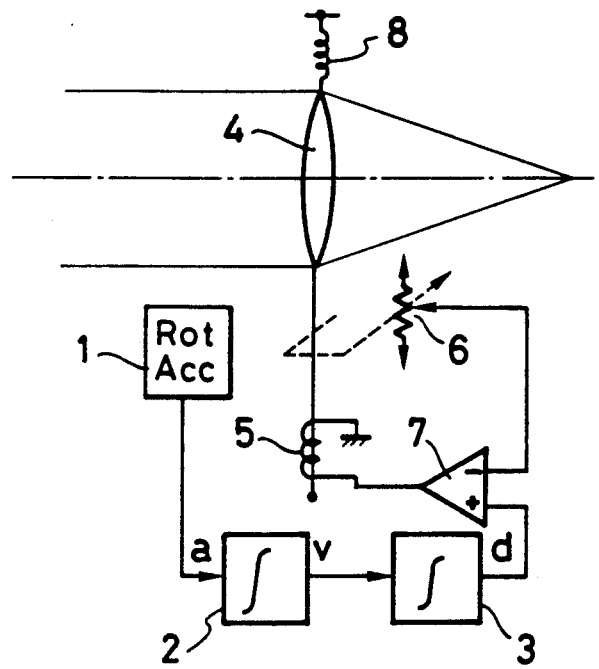
FIG. 19
PRIOR ART
FIG. 20
PRIOR ART
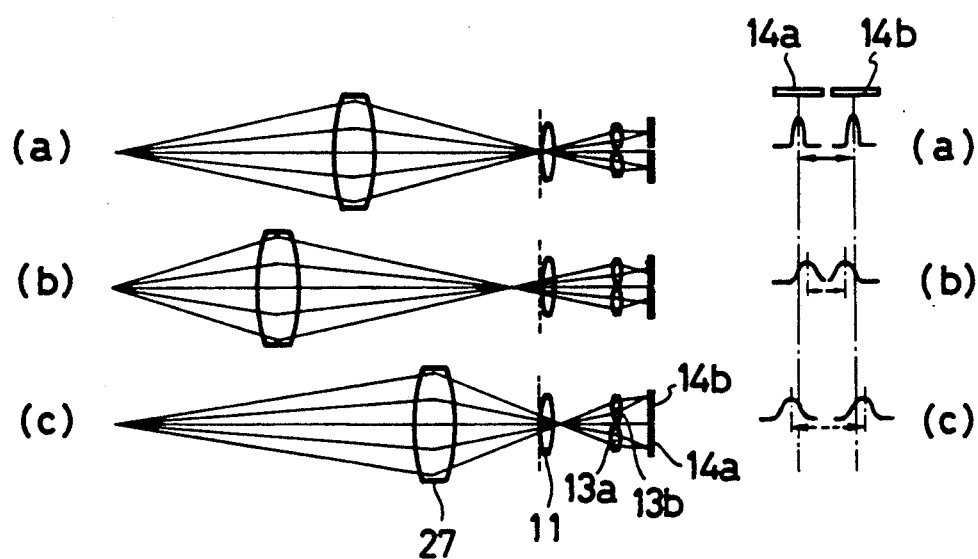

IMAGE STABILIZATION DEVICE FOR A CAMERA

This application is a continuation of application Ser. No. 07/522,084 filed on May 14, 1990, which is a continuation of application Ser. No. 07/423,581 filed on Oct. 17, 1989, which is a continuation of application Ser. No. 07/271,421 filed on Nov. 15, 1988, all three applications now abandoned.

BACKGROUND OF THE INVENTION

1. Field of the Invention

The present invention relates to an image stabilization device for a camera, wherein image displacement caused by a camera-shake due to hand trembling can be eliminated by driving an imaging system such as an optical system.

2. Related Background Art

Various conventional image stabilization devices have been proposed. In such a device, an image displacement on an imaging surface of e.g., a film due to camera-shake caused by a hand trembling or the like, is suppressed such that a lens system as an object to be controlled is driven in a vibration suppression direction.

For example, a camera vibration (normally, a camera vibration with respect to a photographing optical axis) is detected as an acceleration signal, and this acceleration signal is integrated by a signal processing system to obtain a displacement signal (or a velocity signal). The lens system is driven by these signals in a lens vibration suppression vibration of an image).

FIG. 18 is a diagram of a typical arrangement showing a principle of an image stabilization device including a conventional signal processing system of the type described above. An accelerometer (Rot Acc) 1 detects a camera (not shown) vibration with respect to a photographing optical axis as an acceleration signal. A detected acceleration signal a is integrated into a velocity signal v by a first integrator 2. The velocity signal v is then converted into a displacement signal d by a second integrator 3.

An actuator 5 is operated to drive a radially displaceable camera imaging system 4 (normally, an imaging lens system) in the radial direction to achieve image stabilization in accordance with the displacement signal d.

A variable resistor 6 constitutes a position detecting means for detecting an actual positional displacement of the imaging system 4. A signal from this position detecting means is fed back to an input system of the actuator, thereby constituting a feedback loop for matching radial position of the imaging system 4 with the vibration displacement.

A spring 8 urges the imaging system 4 toward a one-side limit position of its movable range during inactivation of the actuator 5. Unnecessary movement of the imaging system 4 during inactivation of the actuator 5 is thus prevented.

In the conventional arrangement described above, a radial position of the imaging system 4 upon activation of the actuator 5 is determined by a balance between the spring force of the spring 8 and a driving force generated by the actuator 5. In order to optimize an image stabilization start operation, an imaging system centering means as an initial position setting means is generally provided due to the presence of the spring 8.

The above operation will be briefly described. An overall radial stroke of the imaging system 4 in the above arrangement is defined as 1, and an origin is defined as a central position (i.e., an /2 position) of the imaging system 4. Then, the imaging system 4 is urged at the −1/2 position by the spring 8 during inactivation of the actuator 5. When the actuator 5 is activated, the imaging system 4 must start an image stabilization operation while being kept urged at the −1/2 position if the centering means is not arranged. As the imaging system 4 is located at a negative limit position, it cannot be further moved in the negative direction. Therefore, a good image stabilization effect cannot be expected.

In order to arbitrarily move the imaging system in the positive or negative direction upon activation of the actuator 5, the imaging system centering means is added to immediately move the imaging system 4 from the −1/2 position to the origin at the activation start timing of the actuator 5 (This operation is called a centering operation). Image stabilization is started after the centering operation by the imaging system centering means is completed. A centering operation time is ideally almost zero. However, in practice, the centering time is about 30 to 100 msec due to an operating time of the imaging system 4 and a vibration damping time after centering.

The centering operation is utilized not only at the start of actuator operation but also during image stabilization control as needed. That is, the stroke of the actuator 5 and outputs from the integrators 2 and 3 are not infinite, and the imaging system may be moved to the stroke limit position within the camera (lens barrel) due to large vibrations. In this case, when the outputs from the integrators 2 and 3 are reset to re-start the centering operation of the imaging system, subsequent image stabilization control can be optimized.

In recent years, most of the commercially available cameras incorporate AF (Auto Focus) units for automatically focusing an image so as to reduce, for example, a load from a photographer. An application of the image stabilization device to an AF camera poses some problems. Prior to a description of these problems, an AF unit will be generally described.

Various types of AF unit are available. A single-lens reflex camera having many interchangeable lenses employs a TTL passive AF unit to cope with focal lengths of various interchangeable lenses from a wide angle lens to a telephoto lens. FIGS. 19(a) to 19(c) show operating states of such a TTL passive AF unit. This AF unit includes a field lens 11 located on an optically equivalent plane to a film surface as a primary imaging plane, a photographing lens 27, and secondary imaging lenses 13a and 13b. Two beams passing through different areas of the photographing lens 27 are independently sampled, and space images formed on the primary imaging plane are formed on distance measuring sensors 14a and 14b again. Each distance measuring sensor comprises a line photoelectric transducer element such as a BASIS or a CCD. Automatic gain control (AGC) for adjusting the photographing condition to the brightness of external light is generally performed by changing an accumulation time of the photoelectric transducer element.

In this AF unit, an in-focus state (FIGS. 19(a) and 20(a)), a forward focus state (FIGS. 19(b) and 20(b)), and a backward focus state (FIGS. 19(c) and 20(c)) are detected in accordance with distances between the object images on the distance measuring sensors 14a and 14b. A photographing lens drive mechanism (not shown) is driven in accordance with the detected state, and automatic focusing or focus adjustment can be achieved.

A camera with a telephoto lens is inevitably vibrated by the operator's hands or even if a tripod is used due to wind. This problem also occurs even in a camera having an AF unit. It is therefore also effective to mount an image stabilization device in the AF camera.

The following problem is posed when the image stabilization device and the AF unit as independent components are mounted in a camera.

Assume that the imaging system is moved to perform image stabilization in the radial direction while a distance measuring operation of the AF unit is being performed. In this case, displacement of an image formed on the distance measuring sensor can be prevented to obtain a good distance measuring effect. However, in the image stabilization device for centering the imaging system to the origin at the start of image stabilization operation, if the centering operation and the distance measuring operation are simultaneously performed, an error often occurs.

A cause of this erroneous operation will be described below.

Assume that charge is accumulated by the photoelectric transducer element serving as a distance measuring sensor, and that the imaging system centering operation of the image stabilization device is being performed. Under these conditions, an object image on the distance measuring sensor is abruptly moved during the accumulating operation. For this reason, a distance measuring disable state occurs due to movement of the image, thus causing a distance measuring error.

The above problems are also presented in association with another device for detecting photographic information by using a photoelectric transducer means.

In addition, the centering operation poses a problem in association with an exposure operation of a silver chloride film or the like. That is, an image stabilization operation must be effective during film exposure. However, when the imaging system 4 is deviated from the center of the stroke and then a release operation is started, the imaging system 4 tends to abut against the stroke end on the side having a small stroke margin. Then, the image stabilization operation tends to be invalidated. For this reason, it is preferable that every time the release operation is started, the centering operation is performed to locate the imaging system 4 at the center of the stroke, and the release operation is started.

However, the centering operation requires a period of 30 to 100 msec. If the release operation is started during the centering operation, the imaging system 4 is moved independently of hand trembling while the shutter is open and the film is exposed to light. Therefore, an image which is displaced in the direction of movement of the imaging system 4 is recorded on the film surface.

SUMMARY OF THE INVENTION

The present invention has been made in consideration of the above situation, and has as its object to provide an image stabilization device comprising an automatic focus detecting means for receiving a beam from an object to use the beam as image information, image processing means such as exposing means, a displacement compensation means for driving an imaging system so as to compensate displacement of an image, initial setting means for setting the imaging system to an initial state for driving by the displacement correcting means, and interlocking control mean for preventing simultaneous driving of the image processing means and the initial setting means, wherein a problem caused by simultaneous driving of the image processing means and the initial setting means can be eliminated, and the image processing means can be optimally operated.

The above and other objects, features, and advantages of the present invention will be apparent from the following detailed description of preferred embodiments in conjunction with the accompanying drawings.

BRIEF DESCRIPTION OF THE DRAWINGS

FIG. 18 is a diagram showing an arrangement of a conventional image stabilization device;

FIGS. 19(a) to 19(c) and FIGS. 20(a) to 20(c) are views for explaining operating states of a conventional passive AF unit.

DETAILED DESCRIPTION OF THE PREFERRED EMBODIMENTS

First Embodiment

Figure 1:
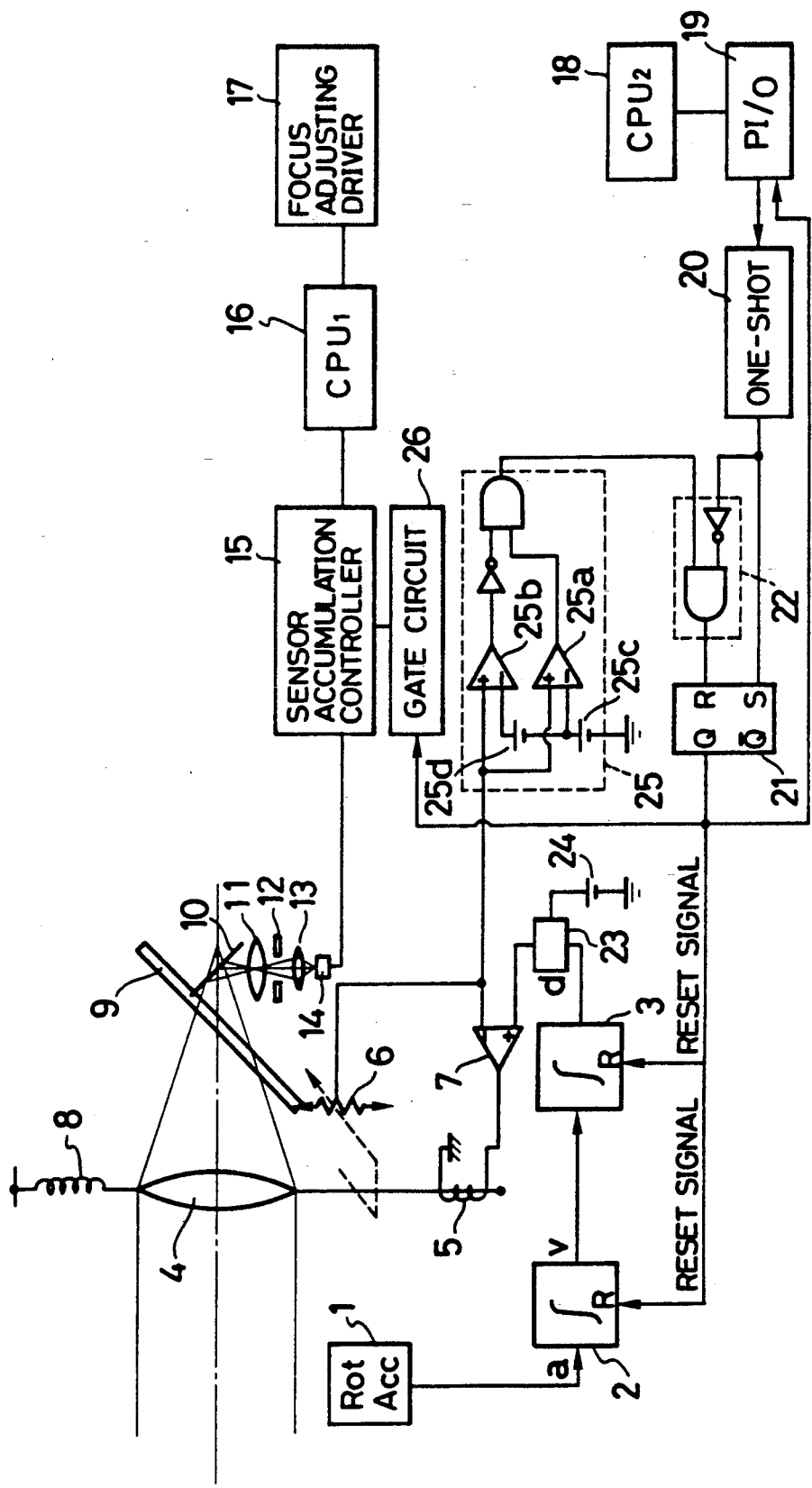
FIG. 1 is a block diagram showing a circuit arrangement of a camera having an image stabilization device according to a first embodiment of the present invention.

FIG. 1 is a block diagram showing an image stabilization device for a camera according to a first embodiment of the present invention. The same reference numerals as in FIGS. 18 to 19(c) denote the same parts in FIG. 1, and a detailed description thereof will be omitted.

This embodiment exemplifies a single-lens reflex camera having an AF unit.

A central position of a quick return mirror 9 is constituted by a half mirror or a pattern mirror as a combination of a total reflection portion and a transparent portion for distance measurement. Light incident on a photographing lens is partially transmitted through the quick return mirror 9 at a predetermined ratio. A sub mirror 10 guides the light passing through the quick return mirror 9 to a distance measuring optical system. The single-lens reflex camera also includes a field lens 11, a fixed aperture 12, a pair of secondary imaging lenses 13, and a pair of line photoelectric transducer elements 14 serving as distance measuring sensors.

A sensor accumulation controller 15 controls the distance measuring sensors 14. A known central processing unit ($CPU_1$) 16 for an AF unit calculates a defocus amount on the basis of a distance measuring principle (described with reference to FIGS. 19(a) to 20(c)) using data from the distance measuring sensors 14 and performs focus adjustment upon driving of a focus adjusting driver 17.

Figure 2:
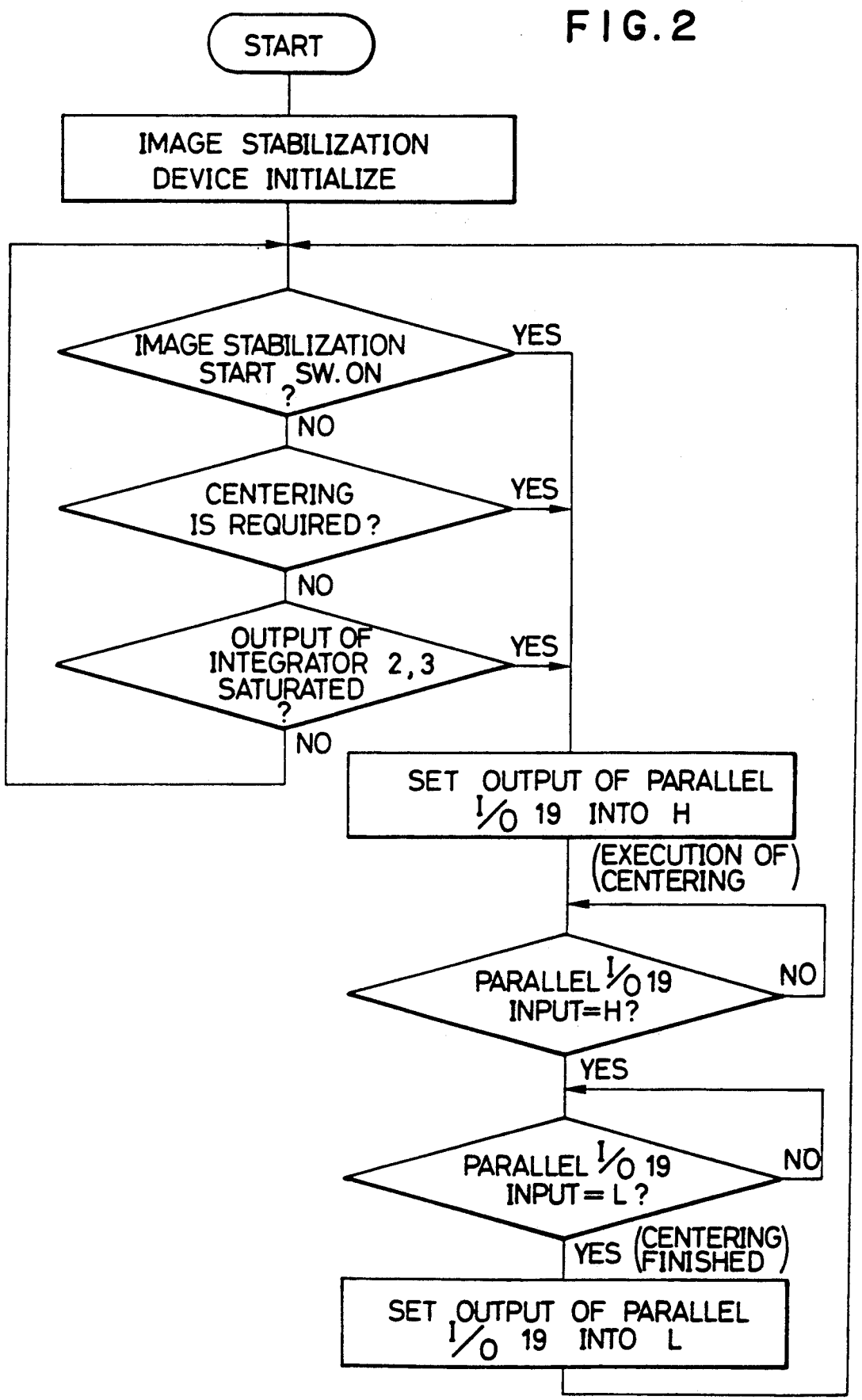
FIG. 2 is a flowchart for explaining control procedures of a CPU in the image stabilization device shown in FIG. 1.

A central processing unit ($CPU_2$) 18 for an image stabilization device performs the centering operation upon operation of an image stabilization start switch (not shown), as shown in a flowchart of FIG. 2. The output port of a parallel I/O (interface) 19 is connected to a one-shot circuit 20. The input port of the parallel I/O 19 is connected to the Q output of an RS flip-flop 21. The one-shot circuit 20 outputs an "H" pulse when an output from the parallel I/O 19 goes high.

The set (S) input terminal of the RS flip-flop 21 is connected to the output terminal of the one-shot circuit 20. The reset (R) input terminal of the flip-flop 21 is connected to a gate circuit 22. The Q output of the flip-flop 21 is connected to the reset input terminals of the integrators 2 and 3, a gate circuit 26, and the parallel I/O 19.

The gate circuit 22 serves as a priority circuit for eliminating an unstable state (R input=S input="H") of the RS flip-flop 21 and giving a priority to the S input over the R input.

A centering reference power source 24 generates a voltage for holding the imaging system 4 at the center (origin) in the stroke range and is arranged such that a voltage as a sum of the voltage of the centering reference power source 24 and an output voltage of the integrator 3, both of which are added by an adder 23, is applied to the operational amplifier 7.

A reset circuit 25 generates a reset output (="H") when the imaging system 4 comes close to the origin. The input terminal of the reset circuit 25 is connected to the position detecting means 6. The output terminal of the reset circuit 25 is connected to the R input of the RS flip-flop 21 through the gate circuit 22.

An arrangement of the reset circuit 25 will be described in detail. The reset circuit 25 includes comparators 25a and 25b. Each comparator generates an output of "H" level when an input voltage applied to the + or noninverting terminal thereof is higher than the input voltage applied to the − or inverting terminal thereof. Otherwise, the comparator generates an output of "L" level. The reset circuit 25 also includes reference power sources 25c and 25d.

If a voltage of the centering reference power source 24, a voltage of the reference power source 25c, and a voltage of the reference power source 25d are defined as $V_{24}$, $V_c$, and $V_d$, respectively, and if the voltages $V_c$ and $V_d$ are determined to satisfy the following equation:

$$V_{24} = V_c + V_d/2 \tag{1}$$

then an output from the reset circuit 25 is set at "H" level only when a voltage V of the position detecting means 6 falls within the following range:

$$V_c < V < V_c + V_d \tag{2}$$

that is, an output from the comparator 25a is set at "H" level and at the same time an output from the comparator 25b is set at "L" level.

The gate circuit 26 controls a sensor accumulation controller 15 to inhibit an accumulating operation of the distance measuring sensors 14 when a Q output from the RS flip-flop 21 is set at "H" level.

An operation of the device having the above arrangement will be described below. FIG. 2 is a flowchart showing control procedures of the $CPU_2$ 18 for the image stabilization device.

Assume that an output Q from the RS flip-flop 21 is set at "L" level, that the integrator 3 is connected to the operational amplifier 7 through the switch circuit 23, and that an image stabilization feedback system constituted by the components 1 to 8 and an automatic focus adjusting system constituted by the components 9 to 17 are rendered operative. Under these assumptions, the automatic focus adjusting system repeats the following operations:

(1) Accumulating operation of the distance measuring sensors 14;

(2) Calculation of defocus amount by using data from the distance measuring sensors 14 under the control of the $CPU_1$ 16; and (3) Driving of the focus adjusting driver 17 on the basis of the defocus amount calculated in step (2).

Centering of the imaging system 4 in the image stabilization system will be described below.

The $CPU_2$ 18 for image stabilization detects an input from a switch (not shown) or saturation of outputs from the integrators 2 and 3 and sets an output of the parallel I/O 19 to be "H" level, thereby starting a centering operation. The one-shot circuit 20 outputs an "H" pulse when the parallel I/O 19 goes high. The RS flip-flop 21 is set in response to this "H" pulse, and a Q output from the flip-flop 21 goes high. When this output Q is set at "H" level, the integrators 2 and 3 are reset. When this output is set at "H" level, the integrators 2 and 3 are reset, and their outputs are cleared to 0. An instruction voltage applied to the operational amplifier 7 is given by only the voltage from the centering reference power source 24. For this reason, a feedback force toward a position designated by the voltage of the reference power source 24, that is, the force acting toward the origin of the imaging system 4, is applied to the components 4 to 8. This operation is called a centering operation. When the Q output from the flip-flop 21 is kept high, an accumulating operation of the distance measuring sensors 14 under the control of the sensor accumulation controller 15 is inhibited by the gate circuit 26. Therefore, distance measurement during centering can be prevented.

When the imaging system 4 comes sufficiently close to the origin as the reference position by the centering operation and the voltage V from the position detecting means 6 falls within the range given by inequality (2), an output from the reset circuit 25 goes high At the same time, the one-shot circuit 20 generates an output pulse. The Q output of the RS flip-flop 21 is reset to "L" level unless the gate circuit 22 inhibits such an operation. When the Q output is set at "L" level, reset inputs to the integrators 2 and 3 go low and a displacement signal d is output from the integrator 3. Therefore the centering operation is finished, and an image stabilization operation is started (restarted). In this case, an input to the gate circuit 26 also goes low, and accumulation inhibition of the distance measuring sensors 14 can be released.

In this embodiment, the Q output from the RS flip-flop 21 is input to the CPU² 18 for image stabilization through the parallel I/O 19 to detect an end of centering upon monitoring of a change in logic level from "H" level to "L" level of the Q output, and the output from the parallel I/O 19 is set at "L" level (FIG. 2). The centering operation of the imaging system in the image stabilization device is thus completed.

Second Embodiment

An interlocking means is arranged to inhibit the operation of the sensor accumulation controller 15 for controlling the distance measuring sensors in the AF unit during the centering operation of the image stabilization device in the first embodiment described above. In a second embodiment shown in FIG. 3, an interlocking means is arranged to inhibit a centering operation of the image stabilization device during an operation of the sensor accumulation controller 15 in the AF unit.

A circuit arrangement of the second embodiment lies in a feature wherein a set (S) input and a reset (R) input to an RS flip-flop 21 for performing the centering operation are controlled by an output (a signal S' during sensor accumulating operation) from the sensor accumulation controller 15. More specifically, the set (S) input is obtained such that the signal S' is input to a one-shot circuit 20 through a gate circuit 22'. Only when the signal S' is set at "L" level, an "H" input is applied from the one-shot circuit 20 to the S terminal of the RS flip-flop 21.

The reset (R) input is applied as an "H" input to the R terminal when either the signal S' or an output from a reset circuit 25 is set at "H" level.

In the second embodiment, a circuit for inhibiting the operation of the sensor accumulation controller 15 during the centering operation of the image stabilization device is omitted. Other arrangements of this embodiment are substantially the same as those of the first embodiment shown in FIG. 1.

With the above arrangement, the centering operation of the image stabilization device is inhibited during the accumulating operation of the distance measuring sensors in the AF unit.

An operation will be described wherein an accumulating operation of the distance measuring sensors 14 is started during a centering operation. When the accumulating operation of the distance measuring sensors 14 is started, a center accumulating signal is set at "H" level by the sensor accumulation controller 15. An output from an OR gate 26' is set at "H" level accordingly, and the RS flip-flop 21 is reset. When the RS flip-flop 21 is reset and its Q output goes low, the centering operation is forcibly interrupted, and the image stabilization operation is re-started.

Third Embodiment

Figure 4:
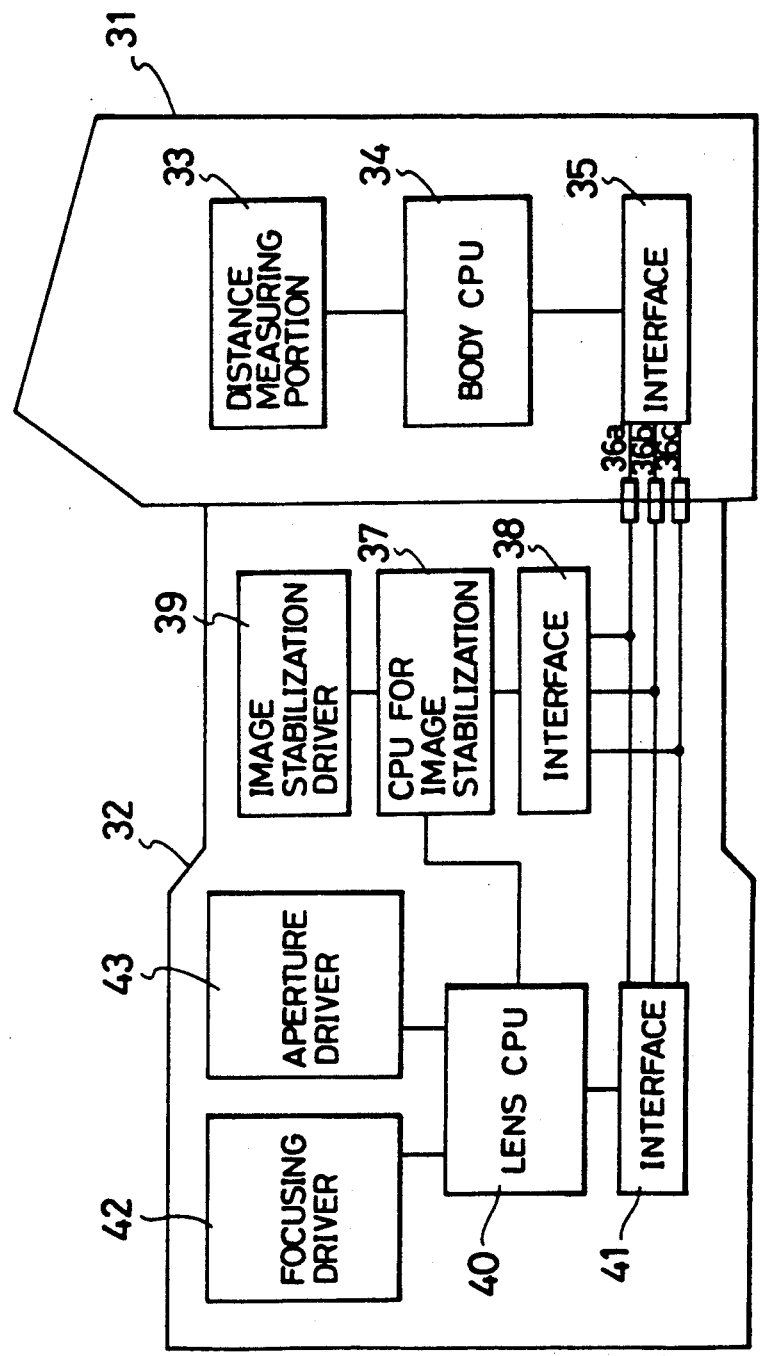
FIG. 4 is a block diagram showing a hardware arrangement of a camera according to a third embodiment of the present invention.

FIG. 4 is a block diagram showing a third embodiment of the present invention. A read-only memory (ROM) is often arranged in each interchangeable lens barrel to adjust differences in focal lengths in an AF single-lens reflex camera, while a camera body receives lens information required for focus adjustment and exposure control calculations from the lens barrel by means of communication. In this embodiment, an accumulation inhibiting means of photoelectric transducer elements in the AF unit utilizes communication.

Referring to FIG. 4, the camera includes a camera body 31, an interchangeable lens barrel 32, and a distance measuring portion 33 including distance measuring sensors and other optical systems. The distance measuring portion 33 corresponds to the components 10 to 15 in the embodiment of FIG. 1. A CPU 34 on the camera body side (to be referred to as a body CPU 34 hereinafter) performs distance measuring operations on the basis of data from the distance measuring portion 33 by means of communication and instructs the resultant lens drive amount to a CPU 40 on the lens barrel side (to be referred to as a lens CPU 40 hereinafter). The body CPU 34 also performs known control operations associated with data display and exposure. The body CPU 34 communicates with the lens CPU 40 through interfaces 35 and 41.

An image stabilization device in this embodiment is built into a lens barrel. An aperture driver 43 and a focusing driver 42 are also built into the lens barrel. An image stabilization CPU 37 controls image stabilization of the image stabilization device and the centering operation. An interface 38 is used as an interface for the image stabilization CPU 37. An image stabilization driver 39 corresponds to the components 1 to 8 in the embodiment of FIG. 1. The device of this embodiment is arranged to disable an operation of the lens CPU 40 under the control of the image stabilization CPU 37. The interfaces 38 and 41 in the lens barrel are connected in parallel with each other and are connected to the body interface 35 through signal terminals 36a to 36c arranged in a mount. Communication is serially performed, e.g., in units of bytes. A communication system is constituted as a communication synchronization clock line 36a for supplying a clock from the body, a signal line 36b for supplying a signal from the body to the lens, a signal line 36c for supplying a signal from the lens to the body, and a ground line (not shown).

An operation of the third embodiment will be described below.

An operation will be exemplified wherein image stabilization and automatic focus adjusting operations are being performed, but a centering operation is not performed.

In an automatic focus adjusting mode, the body CPU 34 sends a transmission request command for data required for distance measuring calculations (e.g., a focal length and sensitivity of a lens) to the lens CPU 40 through the interface 35. When the lens CPU 40 receives the command through the interface 41, the requested data is transmitted to the body in synchronism with a communication clock supplied from the body. The body CPU 34 enables the distance measuring portion 33, and the accumulating operation of the distance measuring sensors in the distance measuring portion 33 is performed. Distance measuring operations are performed on the basis of lens data and data from the distance measuring portion 33. The calculation results are used to calculate a focusing drive amount for achieving an in-focus state and this amount is supplied together with a focusing drive command (e.g., $20_H$ (H: hexadecimal notation)) to the lens CPU 40. The lens CPU 40 drives the focusing driver 42 in accordance with the received focusing drive amount. The above operations are the same as those known to a person skilled in the art. The foregoing operations are repeated to perform the automatic focus adjusting operation.

In this embodiment, the image stabilization CPU 37 monitors through the interface 38 communication between the body CPU 34 and the lens CPU 40. The image stabilization CPU 37 also monitors an integrator output in the image stabilization driver 39. The image stabilization driver 39 is arranged as an analog feedback system constituted by the components 1 to 8 of FIG. 1, and the image stabilization CPU 37 is not directly associated with a feedback loop.

A centering operation according to this embodiment will be described below.

Figure 5:
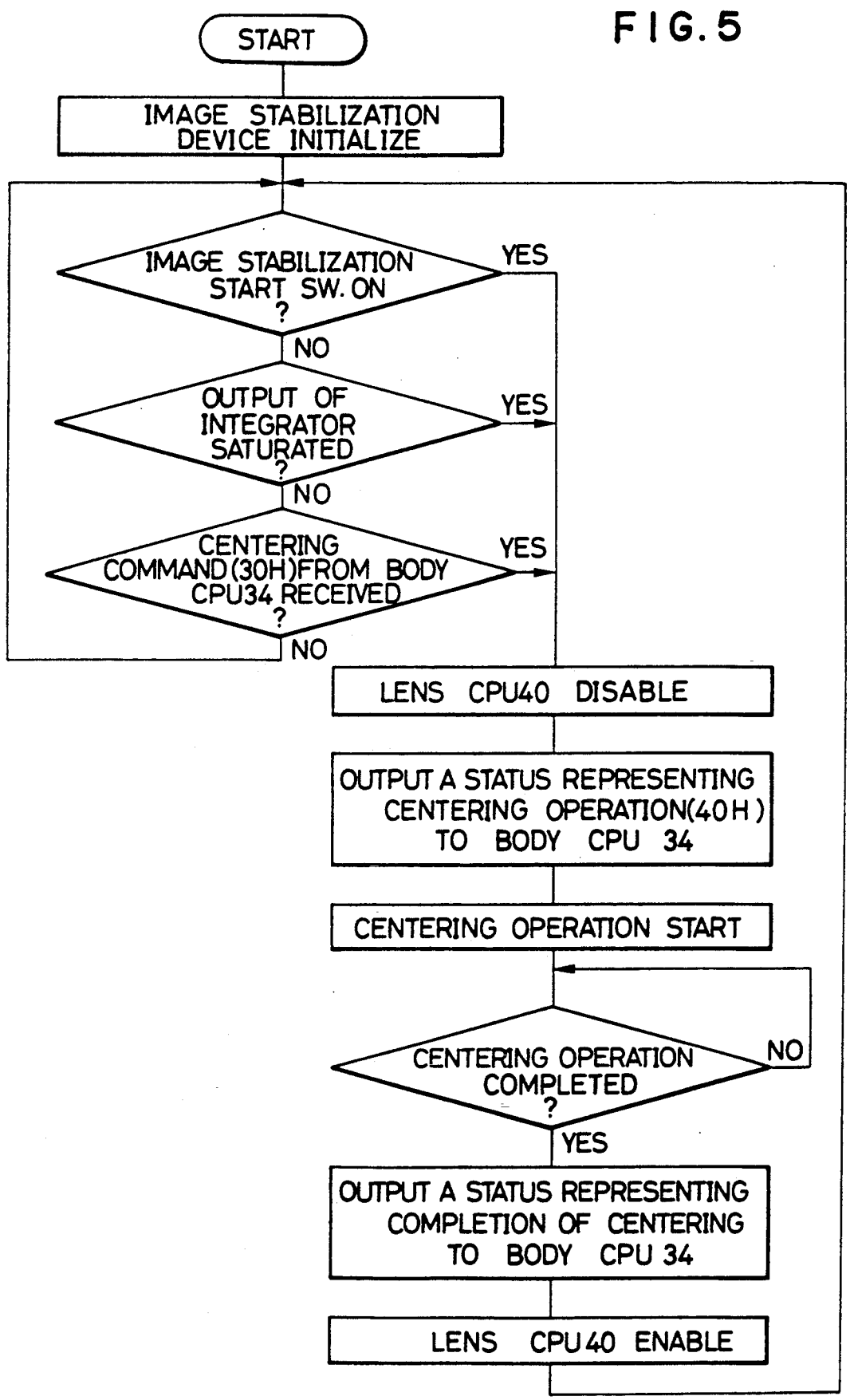
FIGS. 5 and 6 are flowcharts for explaining control procedures of an image stabilization device of the third embodiment.

When outputs from the integrators in the image stabilization driver 39 are saturated or the image stabilization CPU 37 receives a centering command (e.g., $30_H$) from the body CPU 34, the image stabilization CPU 37 performs the operations shown in a flowchart of FIG. 5. The image stabilization CPU 37 disables the lens CPU 40 and transmits a status word (e.g., $40_H$) representing that centering is being executed to the body CPU 34. The image stabilization CPU 37 supplies a centering operation execution signal to the image stabilization driver 39.

Figure 6:
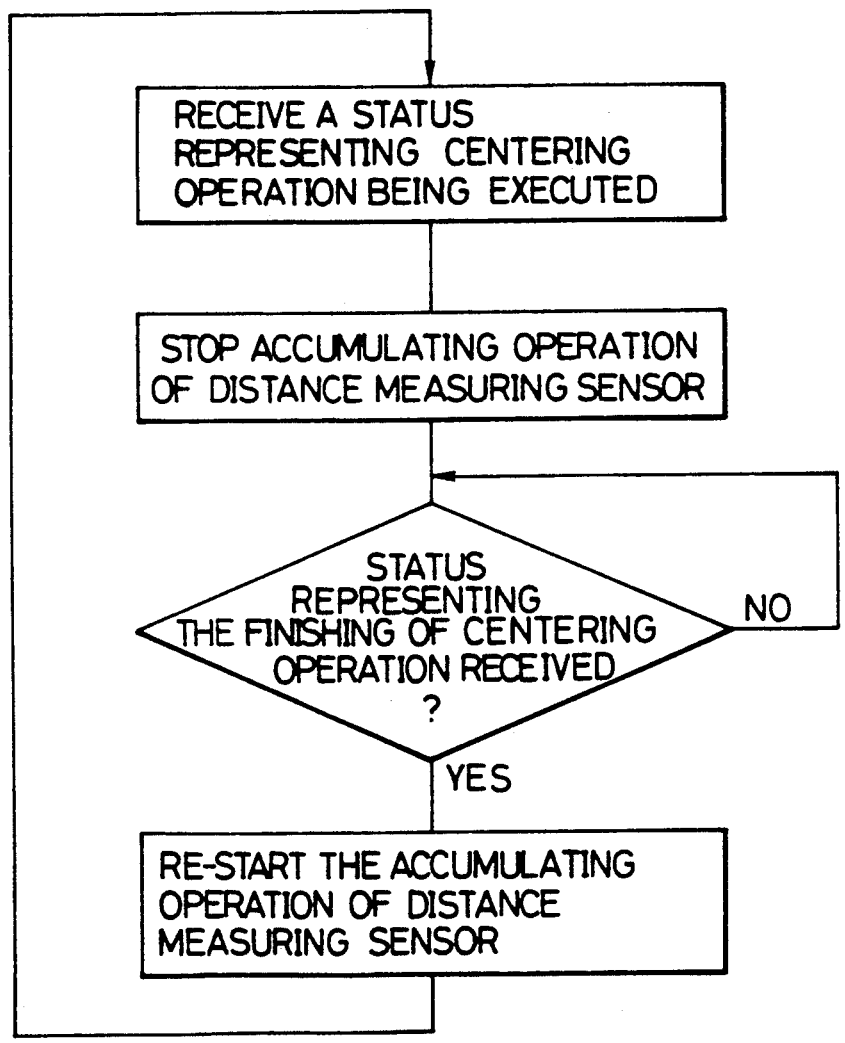

An operation of the body CPU 34 is shown the flow-chart of FIG. 6. When the body CPU 34 receives the status word representing that centering is being executed, the body CPU 34 inhibits an accumulating operation of the distance measuring sensors in the distance measuring portion 33.

When the centering operation is completed, the image stabilization driver 39 automatically restarts an image stabilization operation, and the image stabilization CPU 37 transmits a status word (e.g., $50_h$) representing finishing of centering operation to the body CPU 34. At the same time, a disable state of the lens CPU 40 is cancelled.

When the CPU 34 receives the status word representing the finishing of centering operation, it releases inhibition of the accumulating operation of the distance measuring sensors and allows to an automatic focus adjusting operation restart.

The centering operation of the image stabilization device has a priority over a series of control operations of the AF unit. Therefore, simultaneous operations are inhibited, and a fail-safe AF operation can be assured.

In this embodiment, the image stabilization CPU 37 transmits to the body CPU 34 the status code representing that centering is being executed, thereby inhibiting the accumulating operation of the distance measuring sensors. However, the following arrangement may be alternatively employed. That is, when a lens communication and an accumulating operation of the distance measuring sensors are not simultaneously performed in the body sequence but may be serially performed and a hand shake line is provided to signal an end of communication preparation from the lens CPU to the body CPU (the hand shake line may be constituted by the synchronization clock line 36a), the image stabilization CPU 37 uses a means for forcibly setting the hand shake line in a communication disable state during centering to inhibit communication between the lens CPU and the body CPU. In this case, the body CPU is set in a communication wait state with respect to the lens CPU, and therefore the accumulating operation of the distance measuring sensors can be inhibited during centering. This system has an advantage in that only one hand shake line is used without employing a complex communication protocol.

Fourth Embodiment

Figure 3:
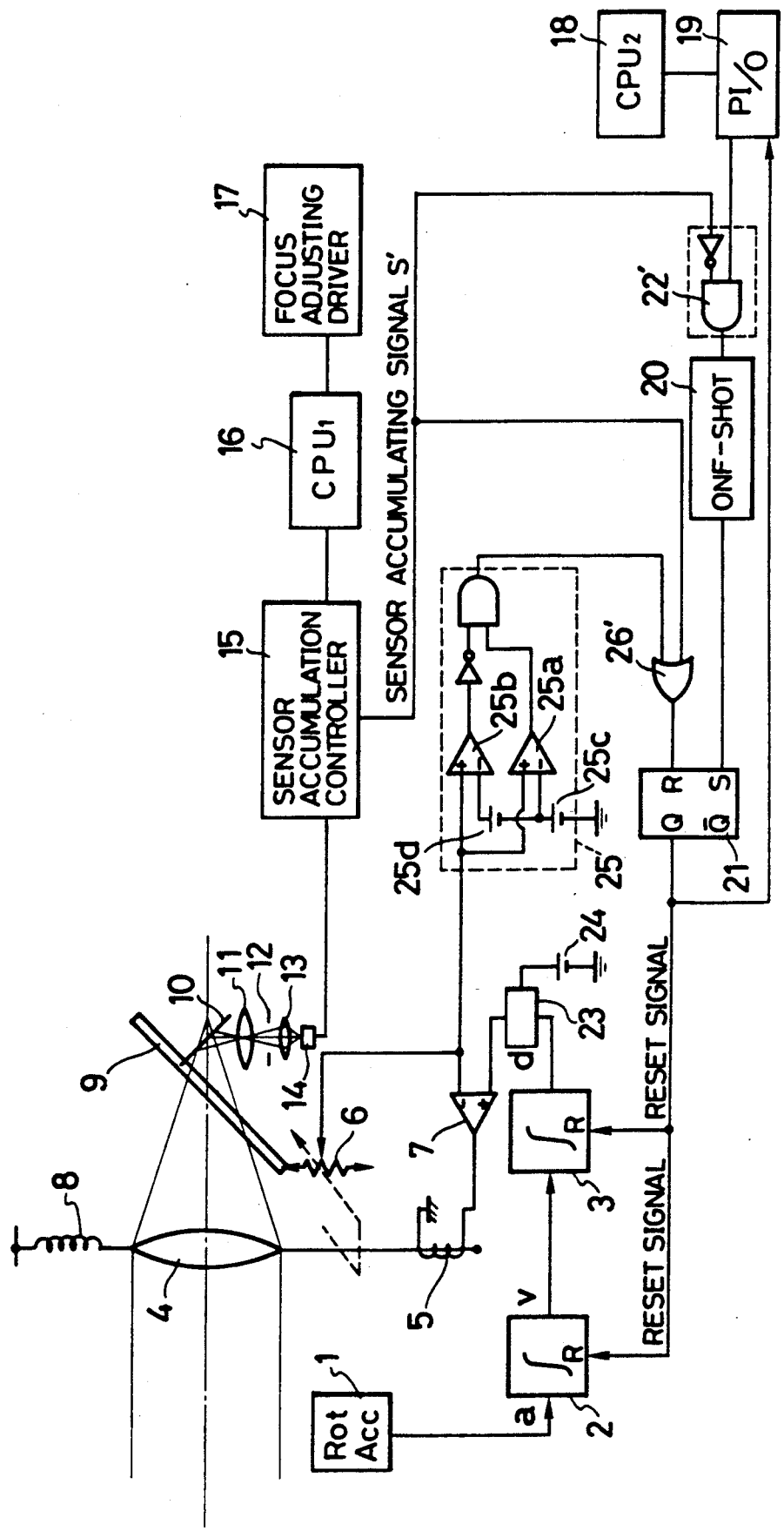
FIG. 3 is a block diagram showing a circuit arrangement of a camera having an image stabilization device according to a second embodiment of the present invention.

In the third embodiment of FIG. 3, the operation of the lens CPU 40 is disabled by the image stabilization CPU 37 shown in FIG. 4. However, the control relationship of FIG. 4 may be reversed as in the relationship between the first and second embodiments.

Figure 7:
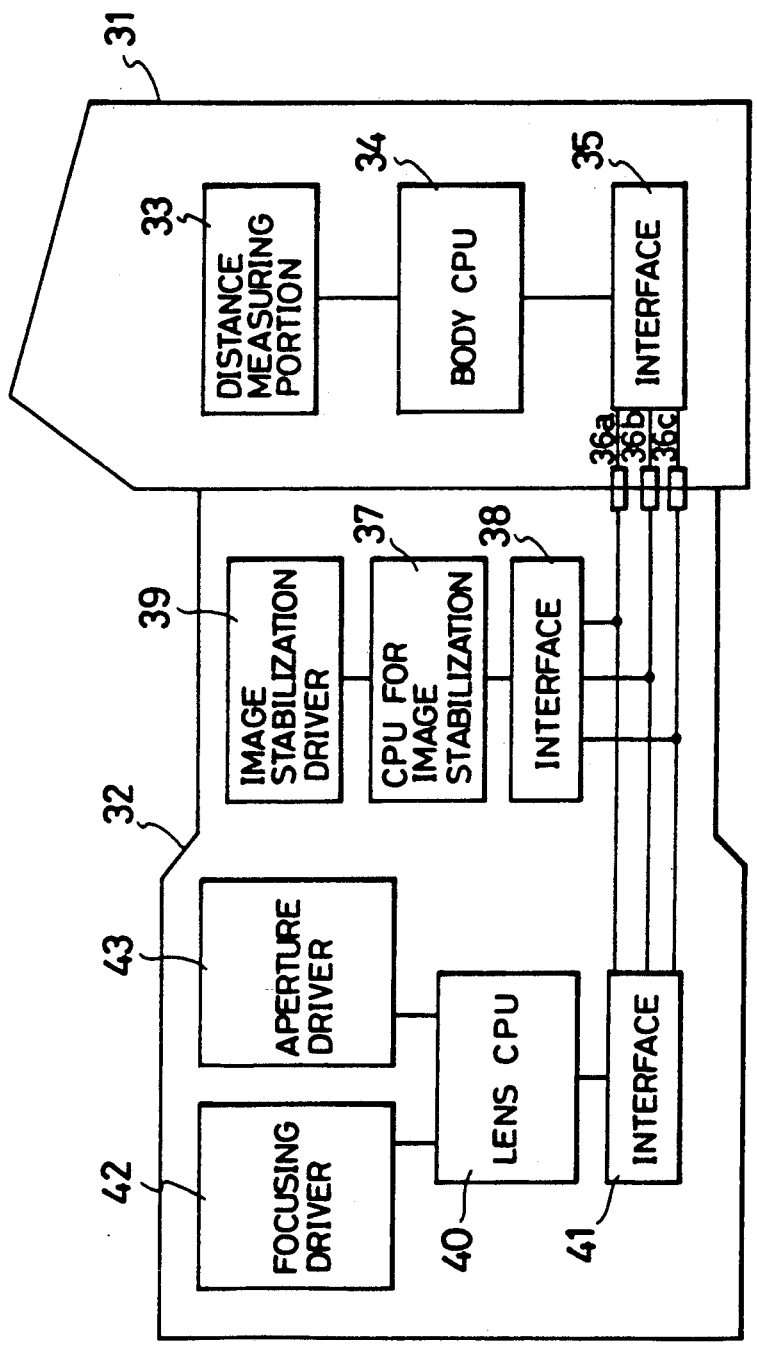
FIG. 7 is a block diagram showing a hardware arrangement of a camera according to a fourth embodiment of the present invention.

The reversed relationship is realized in a fourth embodiment. A camera hardware arrangement of the fourth embodiment is shown in FIG. 7. The hardware arrangement of the fourth embodiment of FIG. 7 is substantially the same as that of FIG. 4 except that a lens CPU 40 is not connected to an image stabilization CPU 37.

An operation of the fourth embodiment will be described below.

Image stabilization and automatic focus adjusting operations in a centering disable state will be described below.

In the automatic focus adjusting operation, the body CPU 34 sends a transmission request command (e.g., $10_H$) for data required for distance measuring calculations to the lens CPU 40 through the interface 35. When the lens CPU 40 receives this command through the interface 41, the requested data is transmitted to the body in synchronism with a communication clock supplied from the body. The body CPU 34 enables the distance measuring portion 33 to cause the distance measuring sensors in the distance measuring portion 33 to start an accumulation operation. The body CPU 34 transmits a status code (e.g., $80_H$) representing that the accumulating operation is being executed. When the accumulating operation of the distance measuring sensors is finished, the body CPU 34 sends a status code (e.g., $90_H$) representing finishing of accumulating operation of the distance measuring sensor to the lens.

The body CPU 34 performs distance measuring calculations on the basis of the lens data received from the lens and the data from the distance measuring sensors in the distance measuring portion 33 to obtain a focusing drive amount so as to set the lens in the in-focus state. The focusing drive amount is sent together with a focusing drive command (e.g., 20H) to the lens CPU 40.

The lens CPU 40 drives the focusing driver 42 in accordance with the received focusing drive amount.

The above operations are known to those skilled in the art. The above operations are repeated to perform the AF operation.

Meanwhile, the image stabilization CPU 37 monitors through the interface 38 communication between the body CPU 34 and the lens CPU 40. When the image stabilization CPU 37 receives from the body a status word representing that the accumulating operation is being executed or representing finishing of the accumulating operation, it stores this status data in its internal memory. The image stabilization CPU 37 monitors to detect the saturation of the outputs from the integrators in the image stabilization driver 39.

An arrangement of the image stabilization driver 39 is the same as that of the third embodiment.

A centering operation will be described with reference to a flowchart in FIG. 8.

In this embodiment, a centering operation is started upon detection of the saturation of the outputs from the integrators in the image stabilization driver 39 or upon reception of a centering command (e.g., $30_H$) from the body CPU 34. For example, when the image stabilization CPU 37 detects the saturation of the outputs from the integrators in the image stabilization driver 39, the image stabilization CPU 37 refers to its internal memory to check if the distance measuring sensors in the body are accumulating charge.

If the memory content represents that the distance measuring sensors are not accumulating the charge, the centering operation is started. However, when the memory content represents that the accumulating operation is being executed, the image stabilization CPU 37 does not start the centering operation until the status word representing finishing of the accumulating operation of the distance measuring sensors is sent from the body CPU 34. When the status word representing finishing of the accumulating operation is received in this state, the image stabilization CPU 37 updates the status memory, thereby starting a routine for starting the centering operation.

When the centering operation is ended, the image stabilization driver 39 automatically restarts an image stabilization operation.

Figure 8C:
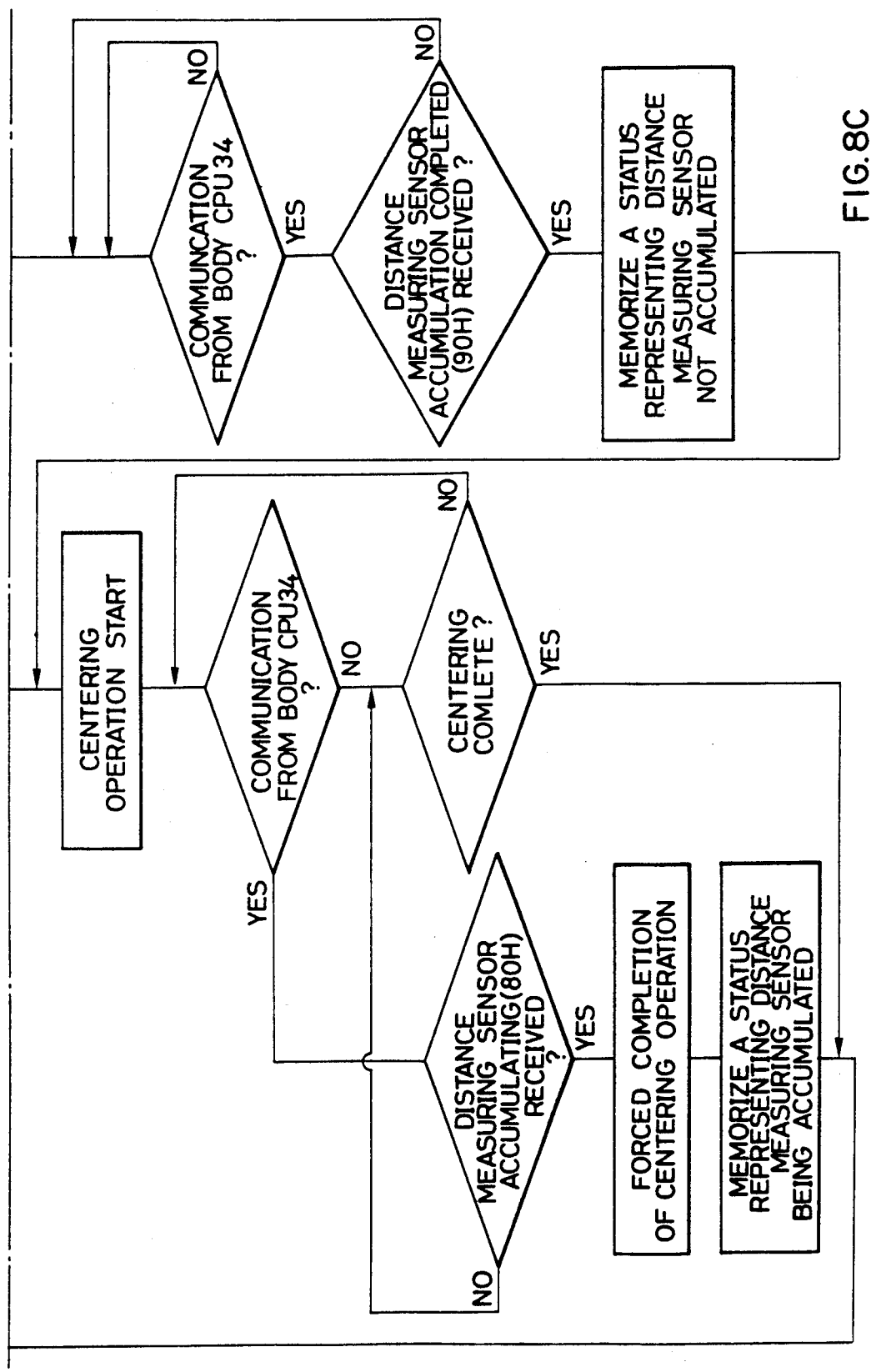
FIG. 8 consisting of FIGS. 8A, 8B and 8C, is a flowchart for explaining control procedures of an image stabilization device according to the fourth embodiment.

During the centering operation, when the status word representing that the accumulating operation of the distance measuring sensors is being executed is sent from the body and received by the image stabilization CPU 37, the image stabilization CPU 37 forcibly interrupts the centering operation and restarts an image stabilization operation (see a branch routine after starting of the centering operation in FIG. 8).

The centering operation of the image stabilization device can be effectively inhibited during the accumulating operation of the distance measuring sensors in the AF unit.

In the first to fourth embodiments, the centering and distance measuring operations are not simultaneously performed. According to the present invention, however, the accumulating signal of the distance measuring sensor may be cancelled during a centering operation, or signal projection may be inhibited during centering in an active AF unit. Any arrangement may be employed if image information received during the centering operation is not used in an AF operation to cause an operation failure.

Fifth Embodiment

Figure 9:
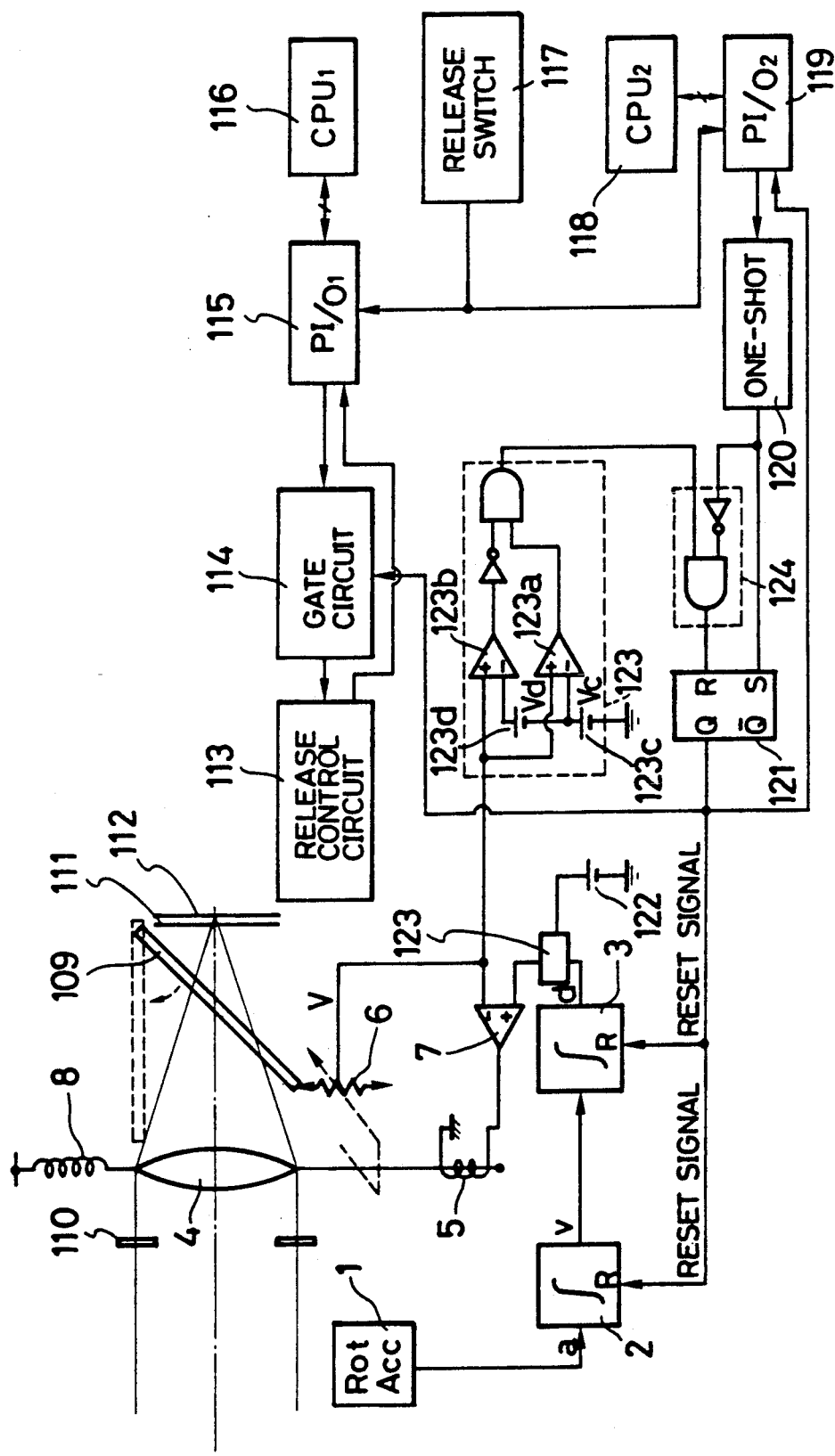
FIG. 9 is a block diagram showing a circuit arrangement of a camera having an image stabilization device according to a fifth embodiment of the present invention.

FIG. 9 is a block diagram showing an image stabilization device for a camera according to a fifth embodiment of the present invention.

The same reference numerals as in FIG. 18 denote the same parts in FIG. 9, and a detailed description thereof will be omitted.

This embodiment exemplifies a case wherein the present invention is applied to a single-lens reflex camera.

The single-lens reflex camera includes a quick return mirror 109, an aperture 110, a shutter 111, and a film 112. A known release control circuit 113 controls the quick return mirror 109, the aperture 110, and the shutter 111 when a release signal input through a parallel I/O$_1$ 115 and a gate circuit 114 goes high. When the release operation is finished, a release operation end signal is output to a main CPU (CPU$_1$) 116 through the parallel interface I/O$_1$ 115. A gate circuit 114 blocks a release signal output from the parallel I/O$_1$ 115 to the release control circuit 113 when a Q output from a flip-flop 121 is set at "H" level.

The parallel I/O$_1$ 115 interfaces signals between the main CPU (CPU$_1$) 116 and a release switch 117, the release control circuit 113, other switches (not shown), or other circuits (not shown).

The known main CPU (CPU$_1$) 116 detects depression of the release switch 117 and generates a release signal. The CPU$_1$ 116 also performs exposure and distance measuring calculations inside the camera.

The release switch 117 is connected to the parallel I/O$_1$ 115 and a parallel I/O$_2$ 119.

When a central processing unit (CPU$_2$) 118 for the image stabilization device detects depression of the release switch 117 through the parallel I/O$_2$ 119, a centering operation is executed. The output port of the parallel I/O (PI/O$_2$) 119 is connected to a one-shot circuit 120, and an input port of the PI/O$_2$ 119 is connected to the release switch 117 and the Q output of an RS flip-flop 121. The one-shot circuit 120 generates an "H" pulse when an output from the parallel I/O$_2$ 119 goes high.

The set (S) input terminal of the RS flip-flop 121 is connected to the output terminal of the one-shot circuit 120, and the reset (R) input terminal of the flip-flop 121 is connected to a gate circuit 124. The Q output of the RS flip-flop 121 is connected to reset input terminals of the integrators 2 and 3, the gate circuit 114, and the parallel I/O$_2$ 119.

The gate circuit 124 serves as a priority circuit for eliminating an unstable state (R input = S input = "H") of the RS flip-flop 121 and giving a priority to the S input over the R input.

A reset circuit 123 generates a reset output (= "H") when the imaging system 4 comes close to the origin. The input terminal of the reset circuit 123 is connected to the position detecting means 6, and the output terminal of the reset circuit 123 is connected to the R input of the RS flip-flop 121 through the gate circuit 124.

An arrangement of the reset circuit 123 will be described in detail below. The reset circuit 123 includes comparators 123a and 123b. When an input voltage applied to the +, or noninverting, input terminal of each comparator is higher than that to the −, or inverting, input terminal thereof, it generates an output of "H" level. Otherwise, the comparator generates an output of "L" level. The reset circuit 123 also includes reference power sources 123c and 123d.

If a voltage of the centering reference power source 122, a voltage of the reference power source 123c, and a voltage of the reference power source 123d are defined as $V_{22}$, $V_c$, and $V_d$, respectively, and if the voltages $V_c$ and $V_d$ are determined to satisfy the following equation:

$$V_{22} = V_c + V_d/2 \qquad (3)$$

then an output from the reset circuit 123 is set at "H" level only when a voltage V of the position detecting means 6 falls within the following range:

$$V_c < V < V_c + V_d \quad (4)$$

that is, an output from the comparator 123a is set at "H" level and at the same time an output from the comparator 123b is set at "L" level.

Figure 10:
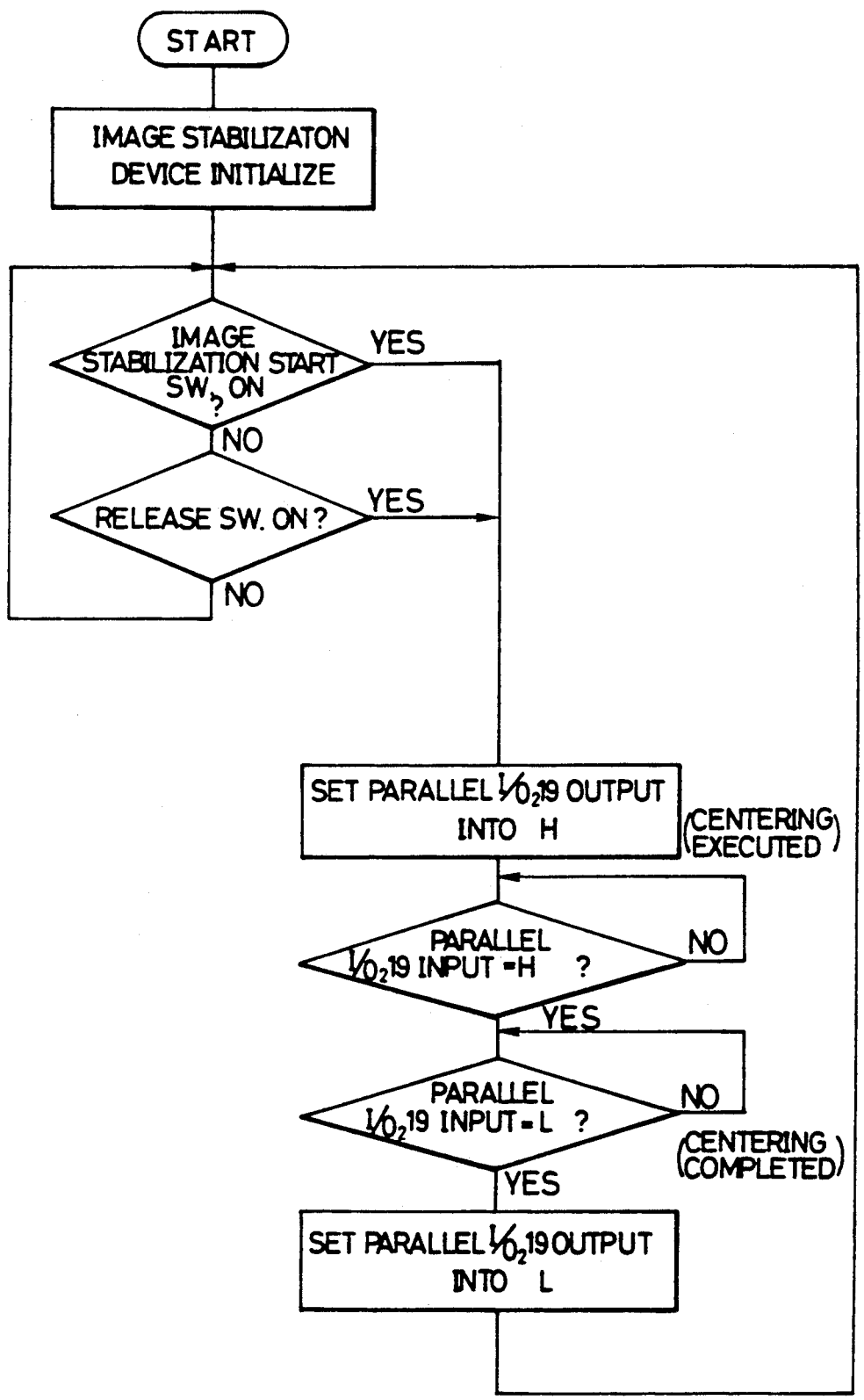
FIG. 10 is a flowchart for explaining control procedures of a CPU of the image stabilization device of FIG. 9.

An operation of the image stabilization device having the above arrangement will be described below. FIG. 10 is a flowchart for explaining control procedures of the CPU₂ 118 of the image stabilization device.

A centering operation is preferably performed at the start of the image stabilization device and at the time of a release operation, as described above. The CPU₁ 118 initializes the image stabilization device and repeats a loop until an image stabilization start switch (not shown) or the release switch 117 is depressed. When the image stabilization start switch or the release switch 117 is depressed, the CPU₂ 118 sets an output from the parallel I/O₂ 119 to be "H" level to start a centering operation. The main CPU 116 sets the release signal from the parallel I/O₁ 115 to be "H" level. At this time, the main CPU 116 has a time lag given by software from ON detection of the release switch 117 to generation of the release signal.

The one-shot circuit 120 generates an "H" pulse when the parallel I/O₁ 119 goes high. When the RS flip-flop 121 receives this "H" pulse, it is set in the set state, and its Q output is set at "H" level. A feedback force toward the position designated by the voltage from the reference power source 122, i.e., a force toward the origin for the imaging system 4, is applied to the components 4 to 8. When the Q output of the RS flip-flop 121 is set at "H" level, a release signal to the release control circuit 113 is inhibited by the gate circuit 114. Therefore, the release operation is not performed but inhibited. When the imaging system 4 comes sufficiently close to the origin as the reference position and the voltage V from the position detecting means 6 falls within the range defined by inequality (4), an output from the reset circuit 123 is set at "H" level, and at the same time, the one-shot circuit 120 generates an output pulse. The Q output from the RS flip-flop 121 is reset to "L" level unless the gate circuit 124 blocks the output pulse from the one-shot circuit 120. When the Q output is set at "L" level, reset inputs to the integrators 2 and 3 are set at "L" level. A displacement signal d is output from the integrator 3 to finish the centering operation and start (restart the image stabilization operation. At the same time, the input to the gate circuit 114 goes low, and blocking of the release signal is released.

In this embodiment, the Q output from the RS flip-flop 121 is input to the image stabilization CPU₂ 118 through the parallel I/O₂ 119. The CPU₂ 118 monitors a change in logic level from "H" level to "L" level of the Q output and detects finishing of the centering operation. Then, the output from the parallel I/O₂ 119 is set at "L" level (FIG. 10). The centering operation of the imaging system in the image stabilization device is thus completed.

In this embodiment, the overall release operation is limited. However, if a series of operations, e.g., up-/down operation of the mirror 109 and stop-down step operation of the aperture 110, constitute a release sequence as in a single-lens reflex camera, this sequence may be interrupted at any time prior to opening of the shutter.

Sixth Embodiment

Figure 11:
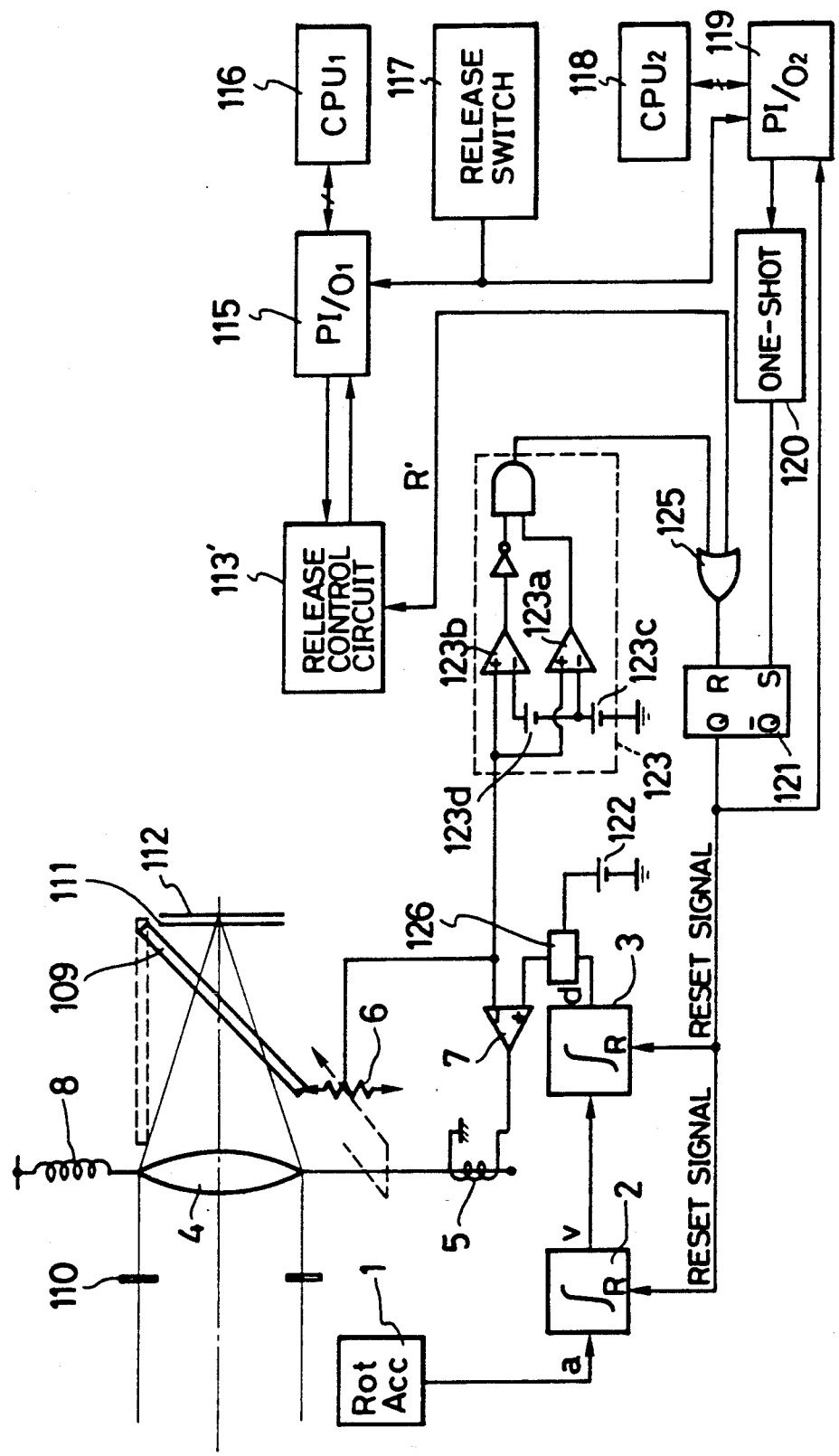
FIG. 11 is a block diagram showing a circuit arrangement of a camera having an image stabilization device according to a sixth embodiment of the present invention.

An interlocking control means is arranged such that the operation of the release control circuit 113 for controlling a release operation is inhibited during the centering operation of the image stabilization device in the fifth embodiment described above. However, an interlocking control means is arranged in the sixth embodiment such that the release operation has a priority over the centering operation as shown in FIG. 11. When the release operation is started, the centering operation is interrupted.

A circuit arrangement of the sixth embodiment lies in a feature wherein a reset (R) input to an RS flip-flop 121 is controlled by a signal (R') such as a mirror up end signal which is generated by a release control circuit 113' at any time prior to opening of the shutter during a release operation. A release control circuit in FIG. 11 of the sixth embodiment is represented by reference numeral 113' so as to distinguish it from the release control circuit 113 of FIG. 9.

The reset (R) input of "H" level is input to the R terminal when either the signal R' or an output from a reset circuit 123 is set at "H" level. In this embodiment, the circuit for blocking the release signal during centering operation of the fifth embodiment is omitted. Other circuit arrangements of the sixth embodiment are the same as those shown in FIG. 9. In the same manner as in the fifth embodiment, a main CPU 116 detects depression of a release button 7, waits for a predetermined period of time to give a priority to the centering operation over the release operation by software, and then generates a release signal. In this embodiment, however, a centering time varies according to the position of an imaging system 4 with respect to the stroke central position at the start of centering. In an extreme case wherein the imaging system 4 abuts against a stroke end, when centering is started, the centering time becomes longer than the wait time of a main CPU 116.

An operation for the above case will be described below.

When the wait time of the main CPU 116 has elapsed during the centering operation, a release signal is output from a parallel I/O₁ 115 to the release control circuit 113'. The release control circuit 113' performs a series of release operations. When mirror up operation of the quick return mirror 9 is ended, the release control circuit 113' sets the R' signal to be "H" level. In this case, when the centering operation is not yet finished, an output from an OR gate 125 goes high accordingly, so that the RS flip-flop 121 is reset. After the Q output goes low, the centering operation is forcibly interrupted, and the image stabilization operation is restarted.

Seventh Embodiment

Figure 12:
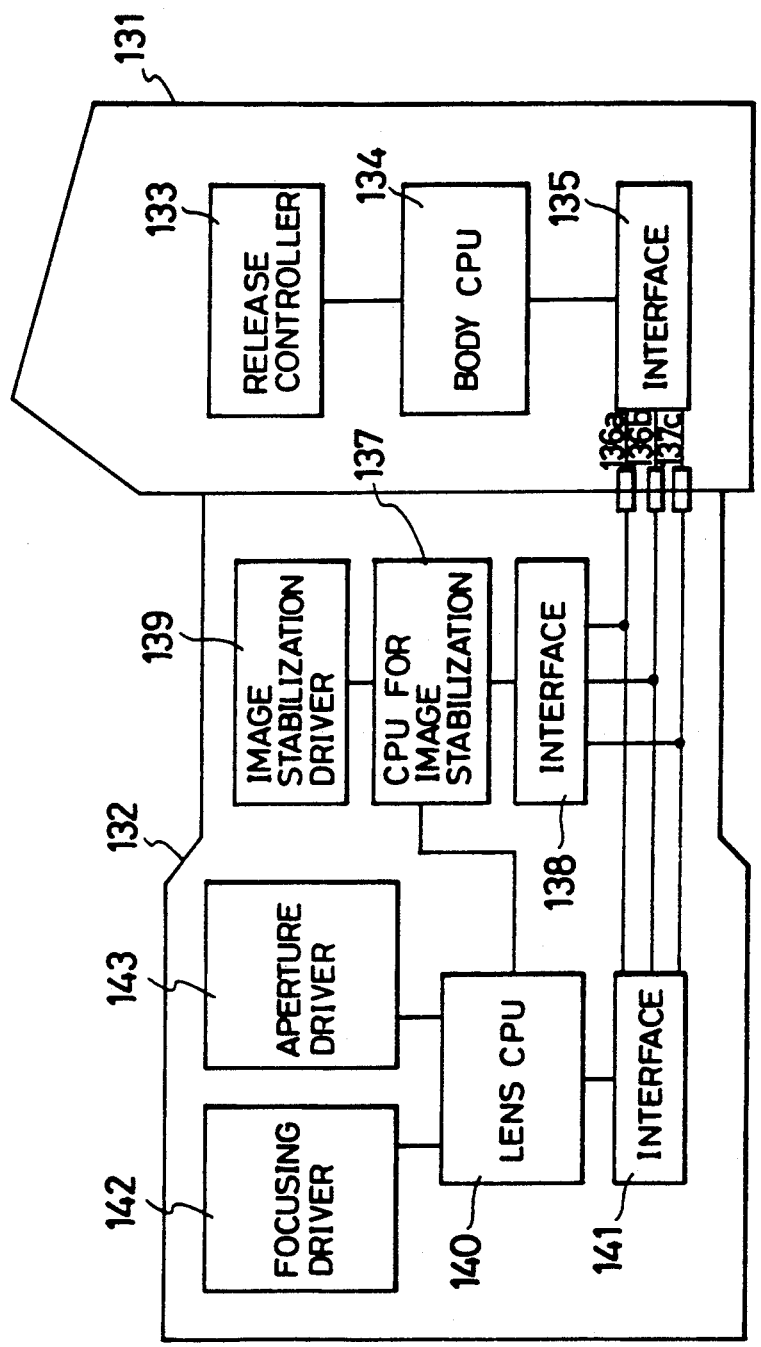
FIG. 12 is a block diagram showing a hardware arrangement of a camera according to a seventh embodiment of the present invention.

FIG. 12 is a circuit diagram showing an arrangement of a seventh embodiment of the present invention. A read-only memory (ROM) is often arranged in each interchangeable lens barrel to adjust differences in focal lengths in an AF single-lens reflex camera, while a camera body receives lens information required for focus adjustment and exposure control calculations from the lens barrel by means of communication. In this embodiment, an accumulation inhibiting means of photoelectric transducer elements in the AF unit utilizes communication.

Referring to FIG. 12, the camera includes a camera body 131, an interchangeable lens barrel 132, and a release control portion 133 corresponding to the component 3 in the fifth embodiment of FIG. 9. A CPU 134 on the camera body side (to be referred to as a body CPU 134 hereinafter) performs distance measuring operations on the basis of data from the distance measuring portion by means of communication and instructs the resultant lens drive amount to a CPU 140 on the lens barrel side (to be referred to as a lens CPU 140 hereinafter). The body CPU 134 also performs known control operations associated with data display and exposure. The body CPU 134 communicates with the lens CPU 140 through interfaces 135 and 141.

An image stabilization device in this embodiment is built into a lens barrel. An aperture driver 143 and a focusing driver 142 are also built into the lens barrel. An image stabilization CPU 137 controls image stabilization of the image stabilization device and the centering operation. An interface 138 is used as an interface for the image stabilization CPU 137. An image stabilization driver 139 corresponds to the components 1 to 8 in the embodiment of FIG. 1. The interfaces 138 and 141 in the lens barrel are connected in parallel with each other and are connected to the body interface 135 through signal terminals 136a to 136c arranged in a mount. Communication is serially performed, e.g., in units of bytes. A communication system is constituted by a communication synchronization clock line 136a for supplying a clock from the body, a signal line 136b for supplying a signal from the body to the lens, a signal line 136c for supplying a signal from the lens to the body, and a ground line (not shown).

In this embodiment, data transmission from the lens side to the body side is controlled by the lens CPU 140. The image stabilization CPU 137 monitors only communication between the body CPU 134 and the lens CPU 140 and does not perform data transmission to prevent collision of serial lines. However, the image stabilization CPU 137 is arranged to transmit a status code representing whether centering is being executed to the body CPU 134 through the lens CPU 140.

A release operation of the seventh embodiment will be described with reference to flowcharts of FIGS. 13 and 14.

Figure 13:
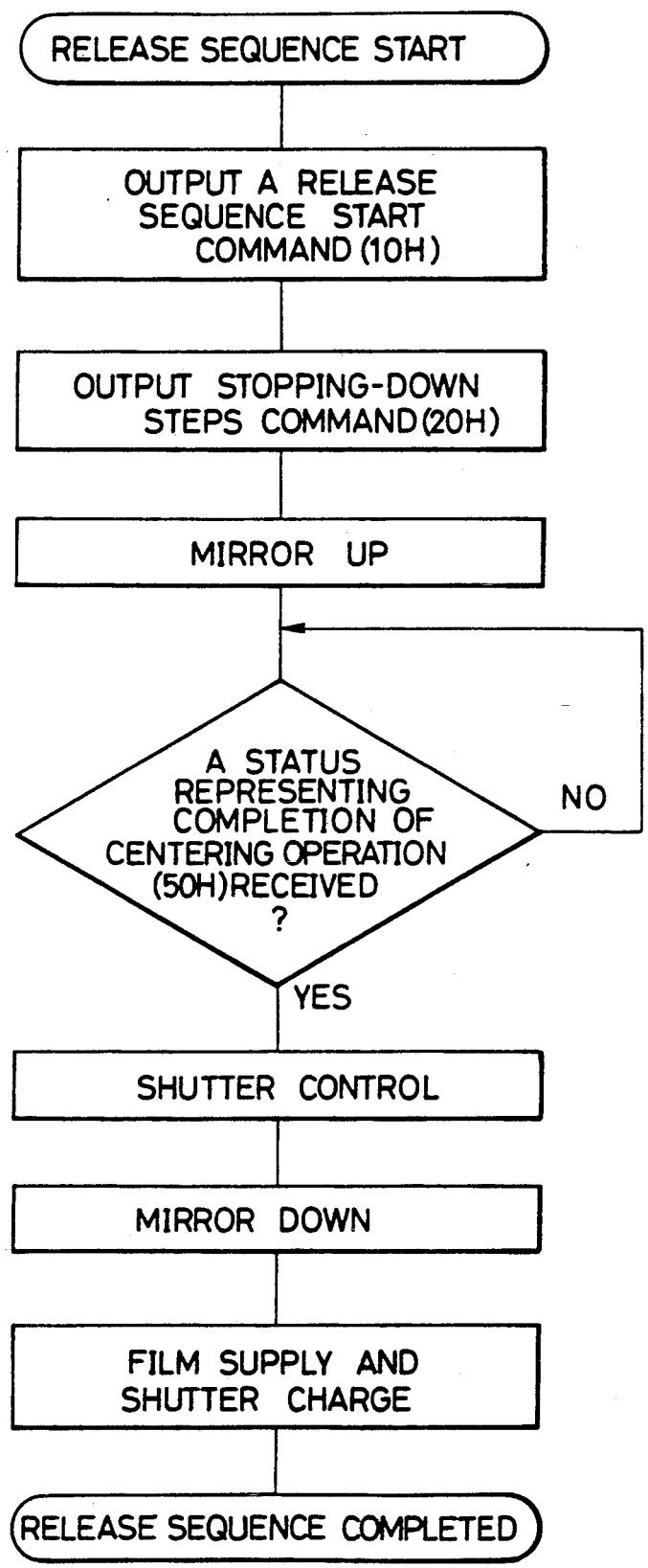
FIGS. 13 and 14 are flowcharts for explaining control procedures of an image stabilization device according to the seventh embodiment.

FIG. 13 is a flowchart showing an operation of a release sequence of the body CPU 134.

Figure 14:
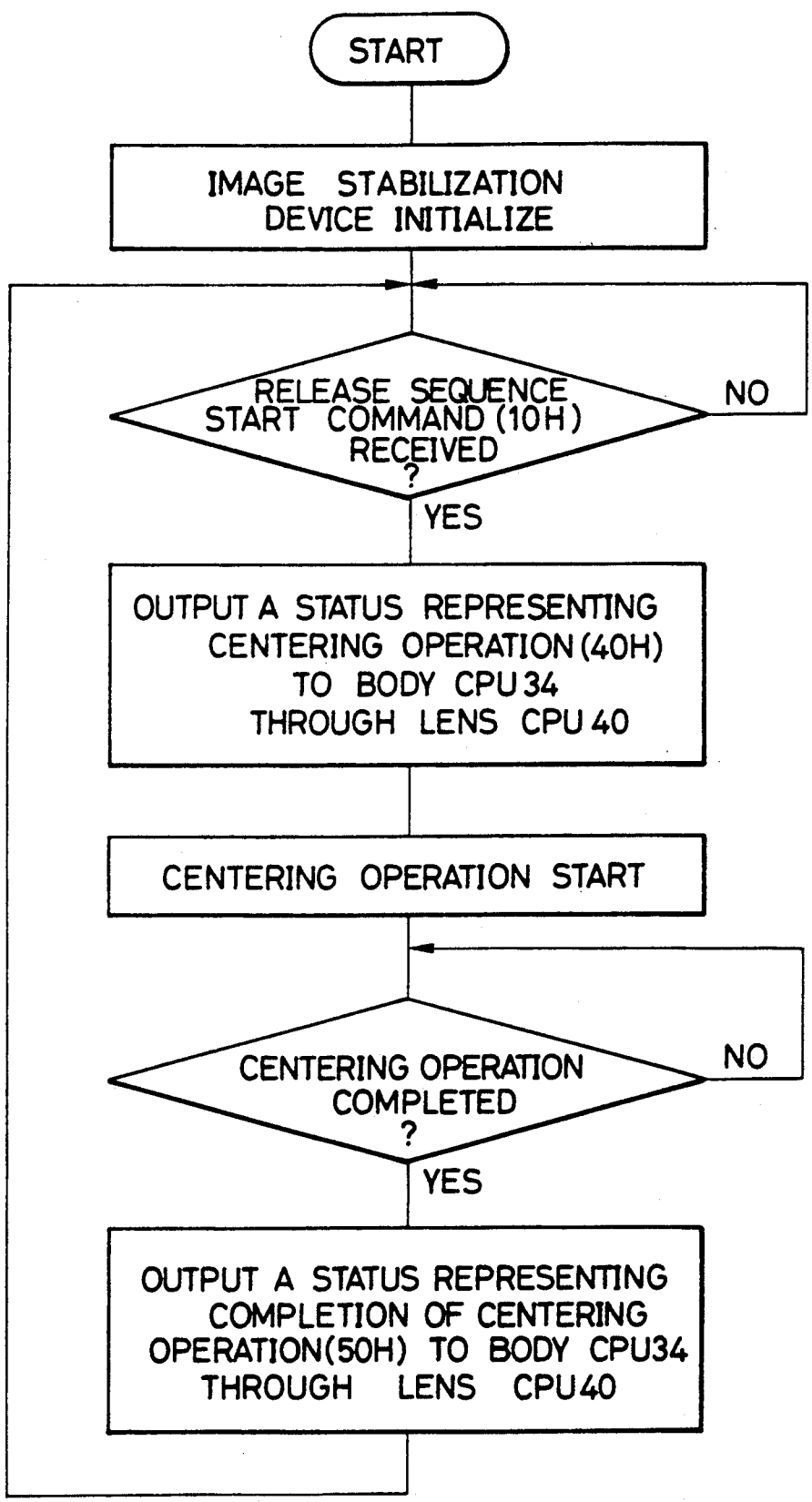

FIG. 14 is a flowchart showing an operation of the image stabilization CPU 137.

When a release switch (not shown) is depressed, the body CPU 134 starts a release sequence.

The body CPU 134 sends out a release sequence command (e.g., $10_H$) representing that the release sequence is started. When the image stabilization CPU 137 receives this command through the interface 138, the image stabilization CPU 137 sends a status code (e.g., $40_H$) representing that the centering operation is being executed to the body CPU 134 through the lens CPU 140. The image stabilization CPU 137 then sends a centering execution signal to the image stabilization driver 139 to start a centering operation. The image stabilization CPU 137 waits until the end of the centering operation. When the centering operation is completed, the image stabilization CPU 137 sends a centering end command (e.g., $50_H$) to the body CPU 134 through the lens CPU 140 and waits until a release operation is started again. When the centering operation is completed, the image stabilization driver 139 automatically starts (restarts) the image stabilization operation.

Meanwhile, the body CPU 134 sends out to the lens CPU 140 a "stopping-down steps" command (e.g., $20_H$) for designating stop-down steps determined by exposure calculations beforehand. When the lens CPU 140 receives this command, the aperture driver 143 is operated to perform a stop-down operation by the designated steps.

The quick return mirror in the body is moved upward through the release control portion 133. When a centering operation is represented by a communication signal from the lens side, the release operation is interrupted until the status representing completion of centering operation is transmitted from the lens side.

When the status representing completion of centering is transmitted, the release operation is restarted to control the shutter through the release control portion 133. A "full aperture" command (e.g., $30_H$) is sent to the lens side so that the quick return mirror is then moved downward, and the aperture is set in a full aperture state. When the lens CPU 140 receives this command, the aperture driver 143 is operated to set the aperture in a full aperture state.

The body CPU 134 winds the film by one frame, and the shutter is charged, thereby completing the release operation.

In this embodiment, the centering operation of the image stabilization device has a priority over the release operation to inhibit simultaneous processing thereof. Therefore, a fail-safe release operation is assured.

In this embodiment, the status code representing that the centering operation is being executed is sent from the image stabilization CPU 137 to the body CPU 134 to inhibit the release operation. When lens communication and the release operation are not simultaneously performed in the body sequence but may be serially performed and a hand shake line is provided to signal an end of communication preparation from the lens CPU 140 to the body CPU 134 (the hand shake line may be constituted by the synchronization clock line 136a), the image stabilization CPU 137 uses a means for forcibly setting the hand shake line in a communication disable state during centering to inhibit communication between the lens CPU 140 and the body CPU 134. In this case, the body CPU 134 is set in a communication wait state with respect to the lens CPU 140, and therefore the release operation can be inhibited during centering. This system has an advantage in that only one hand shake line is used without employing a complex communication protocol.

In this embodiment, the body side is arranged to interrupt the release operation after the mirror up operation. However, the release operation interruption may be performed any time prior to the opening of the shutter during the release operation.

Eighth Embodiment

The release operation on the body side is interrupted by the image stabilization device of the lens side during centering operation in the seventh embodiment of FIG. 12. However, this relationship may be reversed as in the relationship between the fifth and sixth embodiments.

Figure 15:
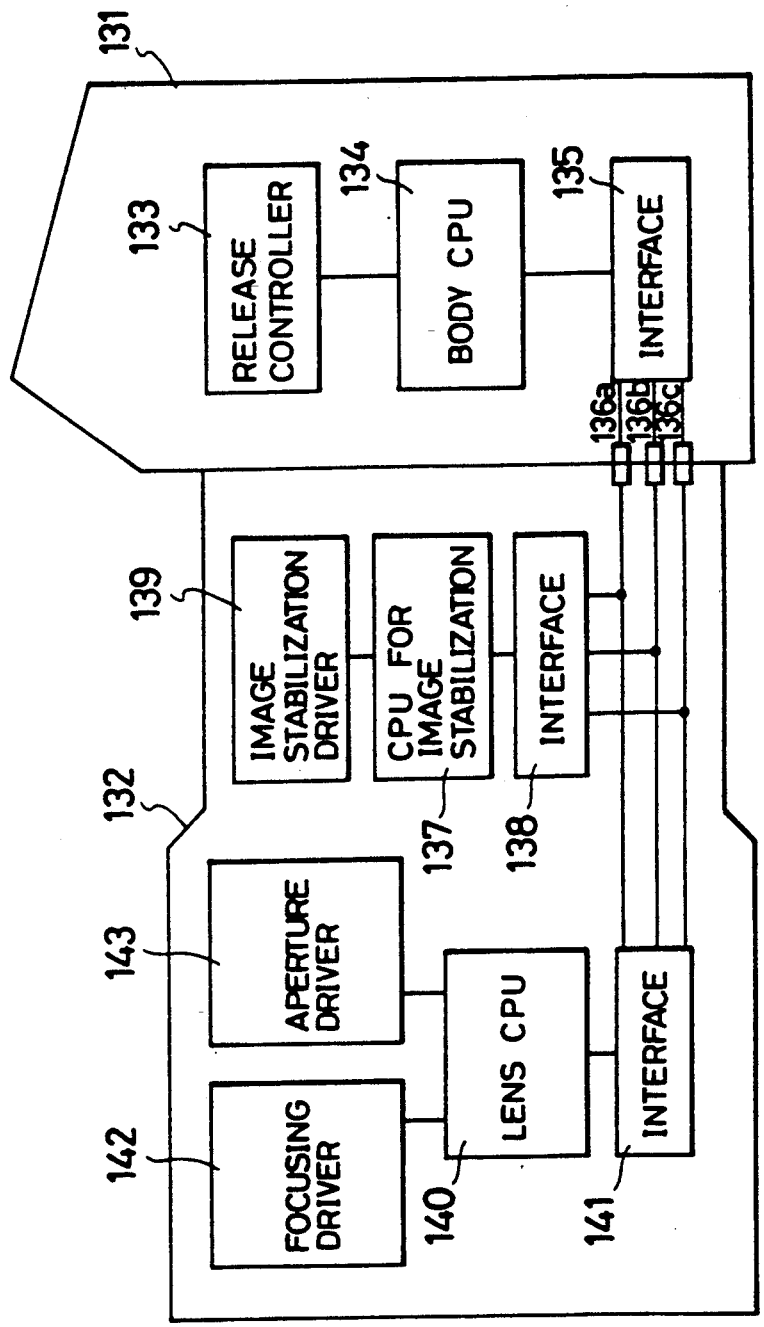
FIG. 15 is a block diagram showing a hardware arrangement of a camera according to an eighth embodiment of the present invention.

The reversed relationship will be described with reference to an eighth embodiment. A camera hardware arrangement is shown in FIG. 15. The hardware arrangement of FIG. 15 is substantially the same as that of FIG. 12 except that the lens CPU 140 is not connected to the image stabilization CPU 137.

An operation of the eighth embodiment will be described with reference to flowcharts of FIGS. 16 and 17.

Figure 16:
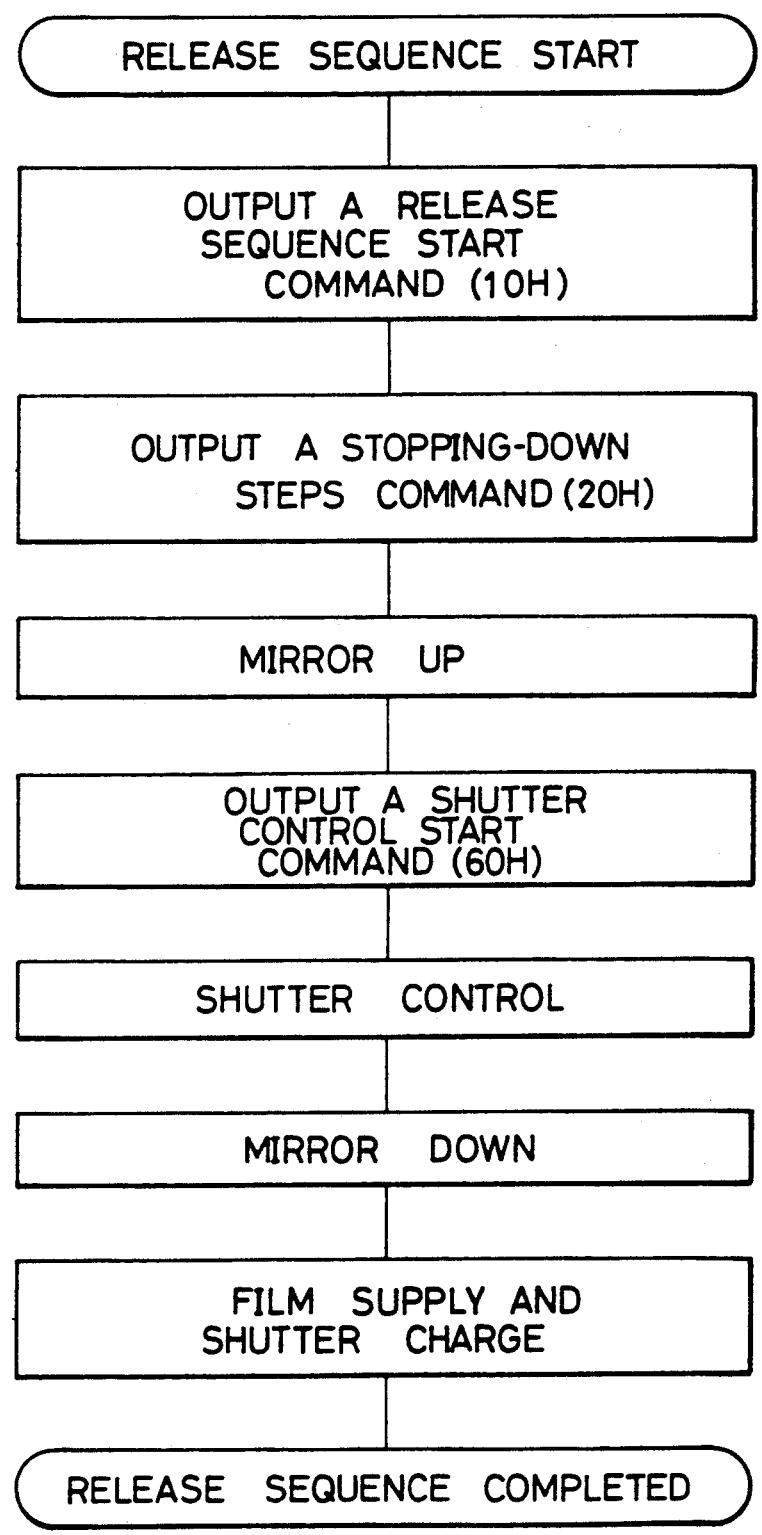
FIGS. 16 and 17 are flowcharts for explaining control procedures of an image stabilization device according to the eighth embodiment.
Figure 17:
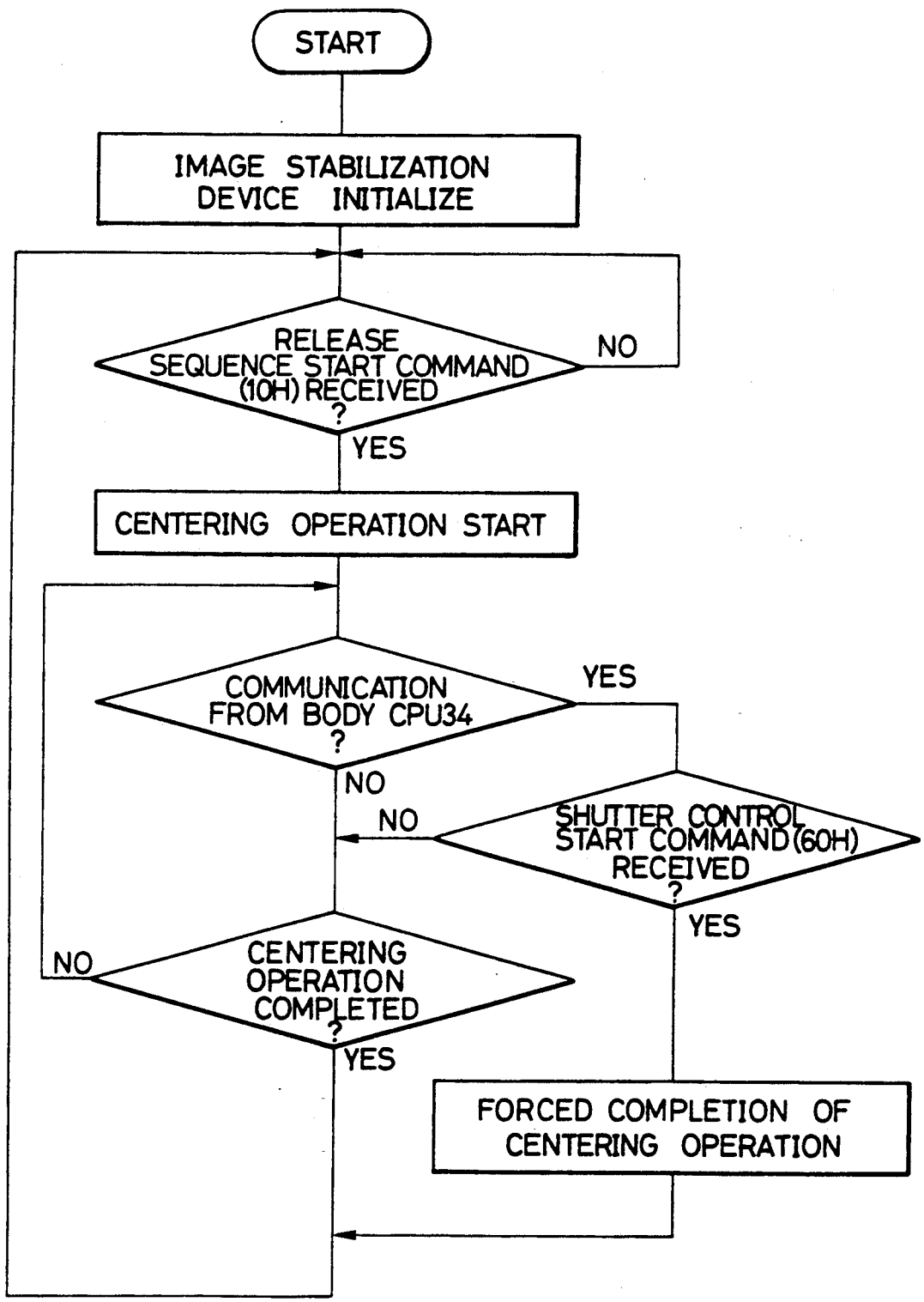

FIG. 16 is a flowchart showing an operation of a release sequence of the body CPU 134, and FIG. 17 is a flowchart showing an operation of the image stabilization CPU 137.

Unlike the seventh embodiment wherein the status code representing that the centering operation is sent from the lens side to the body side, a control start command (e.g., $60_H$) is sent from the body side after a mirror up operation. When a centering operation is kept continuous upon reception of this command by the lens stabilization CPU 137, the centering operation is forcibly interrupted. The operation of the eighth embodiment will be described in more detail below.

The operation of the body CPU 134 until the mirror up operation is the same as that of the seventh embodiment. Meanwhile, the image stabilization CPU 137 receives a release sequence start command to start a centering operation. The lens CPU 140 drives the aperture driver 143 to perform a stopping-down operation by predetermined steps.

The image stabilization CPU 137 repeats a loop until a communication signal is sent from the body CPU 134 or centering operations ends upon starting of the centering operation.

When the centering operation is completed, the image stabilization driver 139 automatically starts (restarts) the image stabilization operation. The image stabilization CPU 137 restores a release operation wait state. If a communication signal is sent from the body CPU 134 prior to the end of centering operation, the flow advances to a branch step in FIG. 17. If a communication signal from the body CPU 134 represents a command except for the shutter control start command, the image stabilization CPU 137 restores a loop for waiting for a communication signal from the body CPU 134 or a centering operation. If the communication signal from the body CPU 134 represents the shutter control start command ($60_H$), the image stabilization CPU 137 forcibly interrupts the centering operation and restores a state for waiting for the next release operation. After the body CPU 134 sends out the shutter control start command ($60_H$), it controls the shutter. The subsequent operations are the same as those of the seventh embodiment, and a detailed description thereof will be omitted.

The centering operation of the image stabilization device during the release operation can be appropriately inhibited.

The present invention is not limited to the particular embodiments described above. Various changes and modifications may be made within the spirit and scope of the invention.

In each of the third, fourth, seventh, and eighth embodiments, the image stabilization unit, the focusing driver, and the aperture driver portion are built into one lens. However, only the image stabilization unit may be separated from the focusing driver and the drive lens portion and may be combined with a conventional extender to constitute an image stabilization adapter. In this case, an image stabilization function can be advantageously added to interchangeable lenses having no image stabilization functions.

In each of the third, fourth, seventh, and eighth embodiments, the image stabilization CPU is independent of the lens CPU. However, these CPUs may be replaced with one CPU.

The present invention is not limited to the single-lens reflex camera but can be extended to a leaf shutter camera. Various modifications may be made for the communicating means and the release sequence in each of the seventh and eighth embodiments.

In each embodiment described above, the present invention is applied to the relationship between the centering operation and the automatic focus adjusting operation or exposure operation. However, the present invention may be applied to a relationship between the centering operation and any other operation. For example, when a spot photometric technique for measuring 2 to 3% of the frame is used while a camera with a telephoto lens having a very long focal length is held by hand to take a picture, a desired object cannot be appropriately shot because of hand trembling. The image stabilization device is very effective in such a case since it can stabilize a finder image. However, when an image is greatly shifted by the centering operation of the imaging system in the image stabilization device, the photometric technique is used to measure light of a small portion of the frame to result in a photometric error. Therefore, the present invention is applied to prevent the centering and spot photometric operations from being simultaneously performed. Therefore, a spot photometric system can thus be effectively utilized.

The present invention is not limited to a camera using a silver chloride film but can be effectively utilized for a video camera and an electronic camera having a mechanical or electro-optical shutter. That is, in a so-called electronic camera for recording an image on an image pickup element such as a CCD in a video floppy disk or a memory, inhibition of an accumulating operation of the image pickup element during the centering operation, and inhibition of the centering operation during the accumulation operation can prevent image displacement during the centering, thus providing a great advantage.

The present invention is not limited to the image stabilization devices of the above embodiments but can be applied to any image stabilization device which drives an imaging system (including an imaging surface) to an initial position for preventing the image deviation by centering the imaging system or the like. The present invention may include any arrangement wherein an operation of an image processing means, such as an automatic focus detecting means or an exposing means, which receives a beam from an object and utilizes the beam as image information is not simultaneously effected with a driving of the image system to an initial state so as to compensate for displacement of the image.

What is claimed is:

1. An image stabilization device including:
   (A) image processing means for receiving a light beam from an object and utilizing the beam as image information;
   (B) blur correcting means for driving an imaging system to correct blurring of an image;
   (C) initial setting means for setting said imaging system to an initial state for driving of said blur correcting means; and
   (D) interlocking control means for inhibiting a simultaneous operation of said image processing means and said initial setting means.

2. A device according to claim 1, wherein said image processing means includes automatic focus detecting means for performing a focus detection operation.

3. A device according to claim 1, wherein said image processing means includes an exposing means for performing an exposure operation.

4. An image stabilizing device according to claim 1, wherein said imaging system includes a lens.

5. An image stabilizing device according to claim 1, wherein said initial setting means includes means for placing said imaging system at a center of an operation range thereof.

6. An image stabilizing device according to claim 1, wherein said interlocking control means includes priority means for establishing a higher priority of operation to said image processing means than to said initial setting means.

7. An image stabilizing device according to claim 6, wherein said priority means includes means for prohibiting an operation of said initial setting means when said image processing means starts to operate.

8. An image stabilizing device according to claim 6, wherein said priority means includes means for starting an operation of said image setting means when said image processing means is in operation.

9. An image stabilizing device according to claim 6, wherein said interlocking control means includes means for automatically starting the operation of said initial setting means after completion of an operation of said image processing means.

10. An image stabilizing device according to claim 6, wherein said priority means includes means for prohibiting an operation of said image processing means when said initial setting means begins to operate.

11. An image stabilizing device according to claim 6, wherein said priority means includes means for starting an operation of said image setting means when said initial setting means is in operation.

12. An image stabilizing device according to claim 6, wherein said interlocking control means includes means for automatically starting the operation of said image processing means after completion of the operation of said initial setting means.

13. An image stabilizing device according to claim 1, wherein said interlocking control means includes priority means for establishing a higher priority of operation to said initial setting means than to said image processing means.

14. An image stabilizing device according to claim 1, further comprising means for prohibiting the operation of said interlocking means at an initial operation stage of said image processing means.

15. An image stabilizing device according to claim 1, wherein said interlocking control means includes means for prohibiting the operation of said initial setting means when said image processing means accumulates light flux from the object.

16. An image stabilizing device according to claim 1, wherein said interlocking control means includes means for prohibiting said image processing means from accumulating light flux from the object.

17. A camera including:
(A) image processing means for receiving a light beam from an object and utilizing the beam as image information;
(B) blur correcting means for driving an imaging system to correct blurring of an image;
(C) initial setting means for setting said imaging system to an initial state for driving said blur correcting means; and
(D) interlocking control means for inhibiting a simultaneous operation of said image processing means and said initial setting means.

18. A camera according to claim 17, wherein said image processing means includes automatic focus detecting means for performing a focus detection operation.

19. A camera according to claim 17, wherein said image processing means includes an exposing means for performing an exposure operation.

20. A camera according to claim 17, wherein said imaging system includes a lens.

21. A camera according to claim 17, wherein said initial setting means includes means for placing said imaging system at a center of an operation range thereof.

22. A camera according to claim 17, wherein said interlocking control means includes priority means for establishing a higher priority of operation to said image processing means than said initial setting means.

23. A camera according to claim 22, wherein said priority means includes means for prohibiting an operation of said initial setting means when said image processing means starts to operate during said initial setting means in operation.

24. A camera according to claim 22, wherein said priority means includes means for starting an operation of said image setting means when said image processing means is being in operation.

25. A camera according to claim 22, wherein said interlocking control means includes means for automatically starting the operation of said initial setting means after completion of an operation of said image processing means.

26. A camera according to claim 22, wherein said priority means includes means for prohibiting an operation of said image processing means when said initial setting means beginning to operate.

27. A camera according to claim 22, wherein said priority means includes means for starting an operation of said image setting means when said initial setting means is in operation.

28. A camera according to claim 22, wherein said interlocking control means includes means for automatically starting the operation of said image processing means after completion of the operation of said initial setting means.

29. A camera according to claim 17, wherein said interlocking control means includes priority means for establishing a higher priority of operation to said initial setting means than to said image processing means.

30. A camera according to claim 17, further comprising means for prohibiting the operation of said interlocking means at an initial operation stage of said image processing means.

31. A camera according to claim 17, wherein said interlocking control means includes means for prohibiting the operation of said initial setting means when said image processing means accumulates light flux from the object.

32. A camera according to claim 17, wherein said interlocking control means includes means for prohibiting said image processing means from accumulating the light flux from the object.

33. An optical apparatus including:

(A) image processing means for receiving a light beam from an object and utilizing the beam as image information;
(B) blur correcting means for driving an imaging system to correct blurring of an image;
(C) initial setting means for setting said imaging system to an initial state for driving said blur correcting means; and
(D) interlocking control means for inhibiting a simultaneous operation of said image processing means and said initial setting means.

34. An optical apparatus according to claim 33, wherein said image processing means includes automatic focus detecting means for performing a focus detection operation.

35. An optical apparatus according to claim 33, wherein said image processing means includes an exposing means for performing an exposure operation.

36. An optical apparatus according to claim 33, wherein said imaging system includes a lens.

37. An optical apparatus according to claim 33, wherein said initial setting means includes means for placing said imaging system at a center of an operation range thereof.

38. An optical apparatus according to claim 33, wherein said interlocking control means includes priority means for establishing a higher priority of operation to said image processing means than to said initial setting means.

39. An optical apparatus according to claim 38, wherein said priority means includes means for prohibiting an operation of said initial setting means when said image processing means starts to operate.

40. An optical apparatus according to claim 38, wherein said priority means includes means for starting an operation of said image setting means when said image processing means is in operation.

41. An optical apparatus according to claim 38, wherein said interlocking control means includes means for automatically starting the operation of said initial setting means after completion of an operation of said image processing means.

42. An optical apparatus according to claim 38, wherein said priority means includes means for prohibiting an operation of said image processing means when said initial setting means beginning to operate.

43. An optical apparatus according to claim 38, wherein said priority means includes means for starting an operation of said image setting means when said initial setting means is in operation.

44. An optical apparatus according to claim 38, wherein said interlocking control means includes means for automatically starting the operation of said image processing means after completion of the operation of said initial setting means.

45. An optical apparatus according to claim 33, wherein said interlocking control means includes priority means for establishing a higher priority of operation to said initial setting means than to said image processing means.

46. An optical apparatus according to claim 33, further comprising means for prohibiting the operation of said interlocking means at an initial operation stage of said image processing means.

47. An optical apparatus according to claim 33, wherein said interlocking control means includes means for prohibiting the operation of said initial setting means when said image processing means accumulates light flux from the object.

48. An optical apparatus according to claim 33, wherein said interlocking control means includes means for prohibiting said image processing means from accumulating the light flux from the object.

* * * * *

UNITED STATES PATENT AND TRADEMARK OFFICE
CERTIFICATE OF CORRECTION

PATENT NO. : 5,101,230
DATED : March 31, 1992
INVENTOR(S) : Shikaumi et al.

It is certified that error appears in the above-identified patent and that said Letters Patent is hereby corrected as shown below:

On the title page,

[56] REFERENCES CITED:

U.S. PATENT DOCUMENTS

"De la Clerva" should read --De La Cierva--.

COLUMN 1:

Line 16, "a" should be deleted;
Line 23, "a" should be deleted; and
Line 32, "suppression vibration" should read --suppression direction (i.e., a direction for suppressing apparent vibration--.

COLUMN 2:

Line 4, "/2" should read -- $\ell/2$ --
Line 19, "(This" should read --(this--; and
Line 34, "re-start" should read --restart--.

COLUMN 4:

Line 35, "Fig. 8" should read --Fig. 8,--.

COLUMN 5:

Line 61, "origin" should read --origin.--.

UNITED STATES PATENT AND TRADEMARK OFFICE
CERTIFICATE OF CORRECTION

PATENT NO. : 5,101,230

DATED : March 31, 1992

INVENTOR(S) : Shikaumi et al.

It is certified that error appears in the above-identified patent and that said Letters Patent is hereby corrected as shown below:

COLUMN 7:

Line 10, "high" should read --high.--; and
Line 23, "$CPU^2$ 18" should read --$CPU_2$ 18--.

COLUMN 8:

Line 7, "re-started." should read --restarted.--.

COLUMN 9:

Line 49, "$50_h$)" should read --$50_H$)--; and
Line 56, "to" should be deleted.

COLUMN 10:

Line 59, "20H)" should read --$20_H$)--.

COLUMN 12:

Line 17, "($CPU_{1/}$)" should read --($CPU_1$)--.

COLUMN 13:

Line 16, "$CPU_1$ 118" should read --$CPU_2$ 118--;
Line 29, "$I/O_1$ 119" should read --$I/O_2$ 119--;

UNITED STATES PATENT AND TRADEMARK OFFICE
CERTIFICATE OF CORRECTION

PATENT NO. : 5,101,230
DATED : March 31, 1992
INVENTOR(S) : Shikaumi et al.

It is certified that error appears in the above-identified patent and that said Letters Patent is hereby corrected as shown below:

```
    Line 39, "When" should read --¶ When--; and
    Line 52, "(restart" should read --(restart)--.

COLUMN 17:

Line 29, "operations" should read --operation.

COLUMN 18:

Line 31, "to-" should read --to--; and
    Line 66, "inhibiting" should read --restricting--.

COLUMN 19:

Line 23, "starting" should read --prohibiting a
      start--;
    Line 24, "an" should be deleted; and "image" should
      read --initial--;
    Line 31, "claim 6," should read --claim 13,--;
    Line 35, "begins" should read --starts--;
    Line 36, "claim 6," should read --claim 13,--;
    Line 37, "starting" should read --prohibiting a start--;
    Line 38, "an" should be deleted; and "setting" should
      read --processing--;
    Line 39, "claim 6," should read --claim 13,--; and
    Line 42, "the" should read --an--.

COLUMN 20:

Line 4, "inhibiting" should read --restricting--;
```

UNITED STATES PATENT AND TRADEMARK OFFICE
CERTIFICATE OF CORRECTION

PATENT NO. : 5,101,230

DATED : March 31, 1992

INVENTOR(S) : Shikaumi et al.

It is certified that error appears in the above-identified patent and that said Letters Patent is hereby corrected as shown below:

```
Line 27, "operate during said initial setting" should
   read --operate.--;
Line 28, "means in operation." should be deleted;
Line 30, "starting an" should read --prohibiting
   a start--;
Line 31, "image" (first occurrence) should read
   --initial--;
Line 32, "being" should be deleted;
Line 38, "claim 22," should read --claim 29,--;
Line 41, "beginning" should read --starts--;
Line 42, "claim 22," should read --claim 29,--;
Line 43, "starting an" should read --prohibiting
   a start--;
Line 44, "setting" should read --processing--;
Line 46, "claim 22," should read --claim 29,--; and
Line 49, "the" should read --an--.
```

COLUMN 21:

```
Line 9, "inhibiting" should read --restricting--;
Line 35, "starting" should read --prohibiting a start--;
   and
Line 36, "an" should be deleted, and "image" should
   read --initial--.
```

COLUMN 22:

```
Line 6, "claim 38," should read --claim 45,--;
Line 9, "beginning" should read --starts--;
```

UNITED STATES PATENT AND TRADEMARK OFFICE
CERTIFICATE OF CORRECTION

PATENT NO. : 5,101,230
DATED : March 31, 1992
INVENTOR(S) : Shikaumi et al.

It is certified that error appears in the above-identified patent and that said Letters Patent is hereby corrected as shown below:

```
Line 10, "claim 38," should read --claim 45,--;
Line 11, "starting" should read --prohibiting a start--;
Line 12, "an" should be deleted and "setting"
   should read --processing--.
Line 14, "claim 38," should read --claim 45,--; and
Line 17, "the" should read --an--.
```

Signed and Sealed this

Twenty-eighth Day of December, 1993

Attest:

BRUCE LEHMAN

*Attesting Officer*   *Commissioner of Patents and Trademarks*